US012634972B2

(12) United States Patent
Xu et al.

(10) Patent No.: US 12,634,972 B2
(45) Date of Patent: May 19, 2026

(54) USER DEVICE, BASE STATION DEVICE, COMMUNICATION METHOD, AND COMPUTER-READABLE STORAGE MEDIUM

(71) Applicant: Sony Group Corporation, Tokyo (JP)

(72) Inventors: Wei Xu, Nanjing (CN); Shuhan Zhu, Nanjing (CN); Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 728 days.

(21) Appl. No.: 17/925,329

(22) PCT Filed: May 17, 2021

(86) PCT No.: PCT/CN2021/094121
§ 371 (c)(1),
(2) Date: Nov. 15, 2022

(87) PCT Pub. No.: WO2021/233249
PCT Pub. Date: Nov. 25, 2021

(65) Prior Publication Data
US 2023/0180272 A1 Jun. 8, 2023

(30) Foreign Application Priority Data
May 22, 2020 (CN) ........................ 202010439319.X

(51) Int. Cl.
*H04W 72/51* (2023.01)
*H04W 72/20* (2023.01)
*H04W 92/18* (2009.01)

(52) U.S. Cl.
CPC ........... *H04W 72/51* (2023.01); *H04W 72/20* (2023.01); *H04W 92/18* (2013.01)

(58) Field of Classification Search
CPC ..... H04W 72/51; H04W 72/20; H04W 92/18; H04W 72/02; H04W 88/04; H04W 4/70;
(Continued)

(56) References Cited

U.S. PATENT DOCUMENTS

| | | | | | |
|---|---|---|---|---|---|
| 2014/0094183 A1* | 4/2014 | Gao | ...................... | H04W 72/51 |
| | | | | 455/450 |
| 2014/0328329 A1* | 11/2014 | Novlan | ............. | H04W 56/0015 |
| | | | | 370/336 |

(Continued)

FOREIGN PATENT DOCUMENTS

| CN | 103068049 A | 4/2013 |
|---|---|---|
| CN | 103843444 A | 6/2014 |

(Continued)

OTHER PUBLICATIONS

International Search Report and Written Opinion mailed on Aug. 16, 2021, received for PCT Application PCT/CN2021/094121, filed on May 17, 2021, 9 pages including English Translation.

(Continued)

*Primary Examiner* — Derrick W Ferris
*Assistant Examiner* — Jesse P. Samluk
(74) *Attorney, Agent, or Firm* — XSENSUS LLP

(57) ABSTRACT

The disclosure is directed to user devices, base station devices, communication methods, and computer-readable storage media. Specifically, a first user device is provided, the first user device being associated with a device cluster, the first user device including a processing circuitry. The processing circuitry is configured to: perform a first transmission between the first user device and a second user device through a master user device of the device cluster via a first link; and perform a direct second transmission between the first user device and the second user device via a second link, wherein the first transmission is performed
(Continued)

with non-competitive resources, and the second transmission is performed with competitive resources.

18 Claims, 15 Drawing Sheets

(58) Field of Classification Search
 CPC ..... H04W 72/40; H04W 76/15; H04W 74/02; H04L 1/1812
 See application file for complete search history.

(56) References Cited

U.S. PATENT DOCUMENTS

| | | | | |
|---|---|---|---|---|
| 2015/0195824 A1* | 7/2015 | Choi | ..................... | H04L 5/0057 |
| | | | | 370/236 |
| 2015/0365942 A1* | 12/2015 | Niu | ..................... | H04L 61/2514 |
| | | | | 370/330 |

| | | | | |
|---|---|---|---|---|
| 2015/0382252 A1* | 12/2015 | Yu | ......................... | H04W 8/005 |
| | | | | 370/331 |
| 2016/0183115 A1* | 6/2016 | Seo | ......................... | H04W 4/70 |
| | | | | 455/422.1 |
| 2018/0270624 A1* | 9/2018 | Lee | ..................... | H04L 65/1063 |

FOREIGN PATENT DOCUMENTS

| | | | | |
|---|---|---|---|---|
| CN | 104202821 A | 12/2014 | | |
| CN | 104618913 A | 5/2015 | | |
| CN | 109548078 A | 3/2019 | | |
| KR | 20190001291 A | 1/2019 | | |
| WO | WO-2015062507 A1 * | 5/2015 | ........... | H04W 74/08 |
| WO | WO-2018094873 A1 | 5/2018 | | |

OTHER PUBLICATIONS

ZTE, "Resource Allocation of D2D communication", 3GPP TSG-RAN WG1 Meeting #74bis, R1-134308, Oct. 7-11, 2013, 6 pages.

* cited by examiner

USER DEVICE, BASE STATION DEVICE, COMMUNICATION METHOD, AND COMPUTER-READABLE STORAGE MEDIUM

CROSS REFERENCES TO RELATED APPLICATIONS

This application is based on PCT filing PCT/CN2021/094121, filed May 17, 2021, which claims the priority of the Chinese patent application titled "USER DEVICE, BASE STATION DEVICE, COMMUNICATION METHOD AND COMPUTER-READABLE STORAGE MEDIUM" with application number 202010439319.X, filed on May 22, 2020, the contents of each of which are incorporated herein by reference in its entirety.

TECHNICAL FIELD

The disclosure is directed to the field of communication, and in particular, to a user device, a base station device, a communication method, and a computer-readable storage medium that may be capable of realizing ultra-reliable and low-latency communication for massive users.

BACKGROUND

5G NR (New Radio) is one of the important development directions of wireless communication technology. Two typical application scenarios for 5G NR include Ultra-Reliable Low Latency Communication (URLLC) and Massive Machine Type Communication (mMTC). URLLC may provide communication with high reliability and low latency for a small number of users, while mMTC may provide communication services for massive users without latency restrictions.

With the expansion of application scenarios for 5G NR, future application scenarios may include ultra-reliable and low-latency communication scenarios for massive users. These scenarios may appear, for example, in drone networks, Internet of Vehicles, Industrial Internet, and so on. In such scenarios, a large number of user devices need to communicate with each other to work together, and communication services are also required to have high reliability and low latency. Such scenarios have demand for URLLC-mMTC services.

A significant bottleneck for implementing the URLLC-mMTC services is that the resources are limited. In the case of serving a large number of users with limited resources, users need to compete or contend for use of resources. This is not conducive to ensuring communication reliability. Furthermore, users may not be allocated sufficient communication resources in a timely manner, and thus need to wait for idle resources. This may result in waiting latency, which cannot meet the requirement of low latency. It is difficult for existing technologies to realize ultra-reliable and low-latency communication for massive users.

SUMMARY

One aspect of the disclosure is directed to a first user device. The first user device is associated with a device cluster and comprises a processing circuit. The processing circuitry is configured to: perform a first transmission between the first user device and a second user device through a master user device of the device cluster via a first link; and perform a direct second transmission between the first user device and the second user device via a second link; wherein the first transmission is performed with non-competitive resources, while the second transmission is performed with competitive resources.

Another aspect of the disclosure is directed to a master user device. The master user device is associated with a device cluster, and the device cluster comprises one or more first slave user devices. The master user device comprises a processing circuit. The processing circuitry is configured to: transmit resource allocation configuration information to each of the first slave user devices. The resource allocation configuration information allocates non-competitive resources to first links between the master user device and each of the first slave user devices in a preset grant-free access manner, and allocates competitive resources to at least second links. The second links include intra-cluster second links among a plurality of first slave user devices, and/or inter-cluster second links between the first slave user devices and user devices that do not belong to the device cluster.

Another aspect of the disclosure is directed to a base station device. The base station device comprises a processing circuitry. The processing circuitry is configured to: divide a plurality of user devices into one or more device clusters, each device cluster comprising an associated master user device and one or more slave user devices; determine resource allocation that allocates non-competitive resources and competitive resources in a preset grant-free access manner, the non-competitive resources being allocated to first links between the master user device of the device cluster and slave user devices of the device cluster, and the competitive resources being allocated to at least second links, the second links including intra-cluster second links among a plurality of slave user devices of a same device cluster and/or inter-cluster second links among user devices belonging to different device clusters; and transmit resource allocation configuration information containing the resource allocation to the master user device and/or the slave user devices.

Another aspect of the disclosure is directed to a method of communication for a first user device associated with a device cluster. The method comprises following operations performed by the first user device: performing a first transmission between the first user device and a second user device through a master user device of the device cluster via a first link; and performing a direct second transmission between the first user device and the second user device via a second link; wherein the first transmission is performed with non-competitive resources, while the second transmission is performed with competitive resources.

Another aspect of the disclosure is directed to a method of communication for a master user device associated with a device cluster, wherein the device cluster includes one or more first slave user devices. The method comprises following operations performed by the master user device: transmitting resource allocation configuration information to each of the first slave user devices, the resource allocation configuration information allocating non-competitive resources to first links between the master user device and each of the first slave user device in a preset grant-free access manner, and allocating competitive resources to at least second links, the second link including intra-cluster second links among a plurality of first slave user devices and/or inter-cluster second links between the first slave user devices and user devices that do not belong to the device cluster.

Another aspect of the disclosure is directed to a method of communication, the method comprising performing, by a base station, following operations: dividing a plurality of user devices into one or more device clusters, each device cluster including an associated master user device and one or more slave user devices; determining resource allocation that allocates non-competitive resources and competitive resources in a preset grant-free access manner, the non-competitive resources being allocated to first links between the master user device of the device cluster and slave user devices of the device cluster, and the competitive resources being allocated to at least second links, the second links including intra-cluster second links among a plurality of slave user devices of a same device cluster and/or inter-cluster second links between user devices belonging to different device clusters; and transmitting resource allocation configuration information containing the resource allocation to the master user device and/or the slave user devices.

Another aspect of the disclosure is directed to a computer-readable storage medium having a computer program stored thereon, which, when loaded and executed by a processor, is used to implement any of the methods involved in the disclosure.

The above approach overview is provided only to provide a basic understanding of various aspects of the subject matter described herein. Accordingly, the technical features in the above solutions are merely examples and should not be construed as limiting the scope or spirit of the subject matter described herein in any way. Other features, aspects, and advantages of the subject matter described herein will become apparent from the following detailed description described in conjunction with the accompanying drawings.

BRIEF DESCRIPTION OF THE DRAWINGS

A better understanding of the disclosure may be obtained when the following detailed description of the embodiments is considered in conjunction with the accompanying drawings. The same or similar reference numbers are used throughout the various drawings to refer to the same or similar components and operations.

DETAILED DESCRIPTION

Specific examples of various aspects of the device and method according to the disclosure are described below. These examples are described only to add context and to aid in the understanding of the described embodiments. Accordingly, it will be apparent to those skilled in the art that the embodiments described below may be implemented without some or all of the specific details. In other instances, well-known operations have not been described in detail to avoid unnecessarily obscuring the described embodiments. Other applications are possible, and aspects of the disclosure are not limited to these specific examples.

1. System

Figure 1:
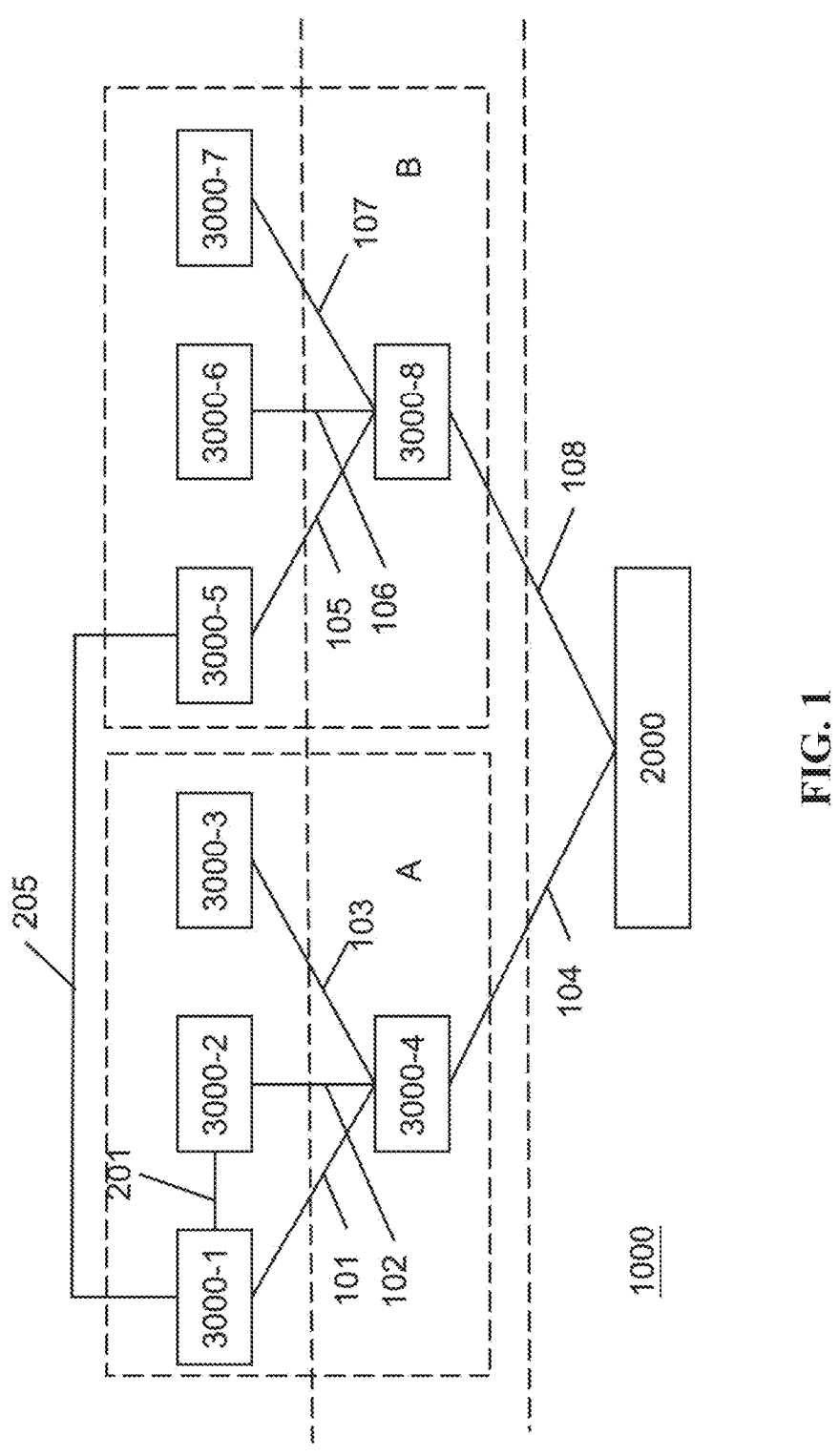
FIG. 1 illustrates a communication system according to embodiments of the disclosure.

FIG. 1 illustrates a communication system 1000 according to embodiments of the disclosure. The communication system 1000 may include a base station device 2000 and one or more user devices 3000. In the example of FIG. 1, the user devices 3000 include a plurality of user devices 3000-1 to 3000-8.

According to embodiments of the disclosure, each user device 3000 may establish and/or maintain a link with the base station device 2000, thereby using wireless communication services provided by the base station device 2000. As an example, the wireless communication services provided by the base station device 2000 may be cellular communication services. Preferably, the cellular communication services may be 5G NR communication services.

According to embodiments of the disclosure, each user device 3000 may also establish and/or maintain a direct link with another user device, thereby enabling direct communication between the two user devices. Such a direct link between user devices may be referred to as a D2D (Device-to-Device) direct link.

It is appreciated in the disclosure that, when a communication system includes massive user devices, it may be problematic to rely only on a direct link between two user devices to achieve communication between the two user devices. The number of direct links will increase significantly as the number of user devices in the communication system increases. In the case that the resources available for the communication system are limited, the limited resources may not be able to meet the communication requirements of all direct links. Each link needs to compete for use of resources, and communication reliability is difficult to guarantee. Also, many links will have to wait for idle resources, which may result in a large waiting latency. Therefore, it may not meet the demands of the URLLC-mMTC scenario.

To solve these problems, according to embodiments of the disclosure, the communication system 1000 may be constructed as a multi-layer architecture. Based on the multi-layer architecture, multi-layer communication links and direct links between user devices may be constructed. Different types of resources may be allocated for multi-layer communication links and direct links. A hybrid access mode may be provided. In the hybrid access mode, users may use the multi-layer communication links and the direct links in a coordinated manner, thereby achieving ultra-reliable and low-latency communication.

According to embodiments of the disclosure, the plurality of user devices in the communication system 1000 may be divided into one or more device clusters. Each device cluster may include one or more user devices. As illustrated in FIG. 1, the user devices 3000-1 to 3000-8 may be divided into two device clusters A and B surrounded by dashed boxes. Device cluster A may include user devices 3000-1 to 3000-4, and the device cluster B may include user devices 3000-5 to 3000-8.

Further, user devices in each device cluster may be designated with a role of a master user device or a slave user device, and links between the master user device of the device cluster and each slave user device of the device cluster may be established. For example, in the device cluster A, user device 3000-4 may be designated as the master user device, while user devices 3000-1, 3000-2, and 3000-3 may be designated as slave user devices. Accordingly, links between the master user device 3000-4 and each of the slave user devices 3000-1, 3000-2, and 3000-3 may be established respectively, as shown by links 101, 102 and 103 illustrated by solid lines in FIG. 1. In the device cluster B, user device 3000-8 may be designated as the master user device, while user device 3000-5, 3000-6, 3000-7 may be designated as slave user devices. Accordingly, links between the master user device 3000-8 and each of the slave user devices 3000-5, 3000-6, 3000-7 may be established respectively, as shown by the links 105, 106 and 107 illustrated by solid lines in FIG. 1.

According to embodiments of the disclosure, a link between a slave user device and a master user device in the same device cluster may be classified as a first link. For example, links 101, 102, 103, 105, 106, 107 may be classified as first links. The first links may form a part of multi-layer communication links.

According to embodiments of the disclosure, it is also possible to establish a direct link between a slave user device and other user devices other than the master user device of the slave user device, and such a link is classified as a second link. The second link may be used for direct communication between two user devices. For example, link 201 between the slave user device 3000-1 and the slave user device 3000-2 and link 205 between the slave user device 3000-1 and the slave user device 3000-5 may be classified as the second link. Further, the second links may be classified into intra-cluster second links or inter-cluster second links. For example, since the slave user device 3000-1 and the slave user device 3000-2 are in the same device cluster, link 201 may be classified as an intra-cluster second link. Since slave user device 3000-1 and slave user device 3000-5 belong to different device clusters, link 205 may be classified as an inter-cluster second link. One or more second links may be optionally established.

In the manner described above, the communication system 1000 may be organized into a multi-layer architecture including a plurality of layers, as illustrated by the horizontal dashed line in FIG. 1. The plurality of layers may include a base station layer, a master user layer, and a slave user layer. The base station layer may include the base station device 2000. The base station device 2000 may be configured to determine and maintain various device clusters, and to determine resource allocation for various user devices 3000 in the device cluster. The master user layer may include master user devices 3000-4 and 3000-8. The master user devices 3000-4 and 3000-8 may manage associated device clusters and/or participate in resource allocation of the device clusters, respectively. The slave user layer may include slave user devices 3000-1, 3000-2, 3000-3 and 3000-5, 3000-6, 3000-7. Each slave user device may receive various configuration information from the base station device 2000 and/or corresponding master user device, and configure itself accordingly.

According to embodiments of the disclosure, a multi-layer communication link between any two user devices may be determined based on the multi-layer architecture. The multi-layer communication link may include a master user device and/or a base station device as routing node(s).

As one example, for the slave user devices 3000-1 and 3000-2 belonging to the same device cluster, the constructed multi-layer communication link may include two parts, namely, the first link 101 and the first link 102. This multi-layer communication link only includes the master user device 3000-4 as a routing node.

As another example, for the slave user devices 3000-1 and 3000-5 belonging to different device clusters, the constructed multi-layer communication link may include four parts, that is, the first link 101 between the slave user device 3000-1 and the master user device 3000-4, the link 104 between the master user device 3000-4 and the base station device 2000, the link 108 between the base station device 2000 and the master user device 3000-8, and the first link 105 between the master user device 3000-8 and the slave user device 3000-5. This multi-layer communication link includes the master user device 3000-4, the base station device 2000, and the master user device 3000-8 as routing nodes sequentially.

As yet another example, for the slave user device 3000-1 and the master user device 3000-8 that do not belong to the same device cluster, the constructed multi-layer communication link may include three parts, that is, the first link 101 between the slave user device 3000-1 and the master user device 3000-4, the link 104 between the master user device 3000-4 and the base station device 2000, the link 108 between the base station device 2000 and the master user device 3000-8. This multi-layer communication link includes the master user device 3000-4 and the base station device 2000 as routing nodes sequentially.

According to embodiments of the disclosure, a multi-layer communication link and a direct link between two user devices may be collectively used for communication between the two user devices. Also, different types of communication resources may be allocated for the multi-layer communication link and the direct link between the two user devices. Further details on resource allocation are discussed in detail in Sections 4-5.

According to embodiments of the disclosure, the communication system 1000 may be applied to various scenarios. For example, the communication system 1000 may be applied to a drone network, where each user device 3000 may be associated with a respective drone device. Or, the communication system 1000 may be applied to the Internet of Vehicles, wherein each user device 3000 may be associated with a respective in-vehicle device. Alternatively, the communication system 1000 may be applied to the industrial Internet, where the user device 3000 may be associated with a plurality of machine devices that need to cooperate. It may be understood that the communication system 1000 may be applied to any scenario that requires a plurality of user devices to communicate with each other to cooperate.

It should be noted that the numbers of the user device 3000 and the base station device 2000 in the communication system 1000 as illustrated in FIG. 1 are merely exemplary. The communication system 1000 may include fewer user devices 3000. In practical application scenarios, the communication system 1000 may include more user devices (for example, dozens, hundreds, thousands, or more). When the user device 3000 spans multiple cells, the communication system 1000 may also include multiple base station devices 2000 that collaborate with each other.

Furthermore, the division of device clusters illustrated in FIG. 1 is merely exemplary. According to other embodiments of the disclosure, the plurality of user devices in the communication system 1000 may be divided into more or less device clusters, and the number of user devices included in each device cluster may be equal or not. Additionally, the designation of the master user device in FIG. 1 is merely exemplary. According to other embodiments of the disclosure, another user device in the device cluster A (or the device cluster B) may be designated as the master user device, and the remaining user devices may be designated as slave user devices. Further details on the division of device clusters and the designation of the master user device will be discussed in detail in Section 4.1.

2. Base Station Device

Figure 2:
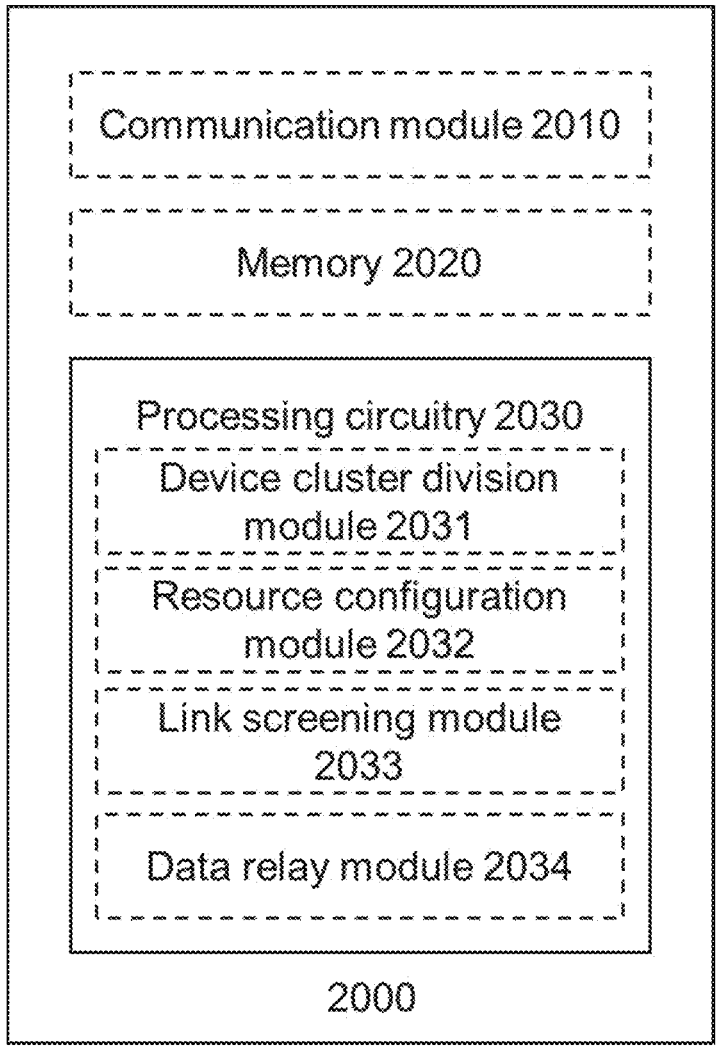
FIG. 2 illustrates a base station device according to embodiments of the disclosure.

FIG. 2 illustrates a base station device 2000 according to embodiments of the disclosure. The base station device 2000 may be an example of the base station device described with respect to FIG. 1.

According to embodiments of the disclosure, the base station device 2000 may provide wireless communication services for user devices. Preferably, the base station device 2000 may provide cellular communication services. The base station device 2000 may include any type of base station, preferably, a macro gNB and a small gNB in the 5G communication standard New Radio (NR) access technology of 3GPP. Small gNBs may be gNBs covering cells smaller than macro cells, such as pico gNBs, micro gNBs, and home (femto) gNBs. Instead, the base station device 2000 may be implemented as any other type of base station, such as a NodeB and a Base Transceiver Station (BTS). The base station device 2000 may also include a main body configured to control wireless communication and one or more Remote Radio Heads (RRHs) disposed at a different place from the main body. The base station device 2000 may also be a wireless communication module (such as an integrated circuit module including a single wafer) installed in various devices described above.

According to embodiments of the disclosure, the base station device 2000 may include a communication module 2010, a storage module 2020, and a processing circuitry 2030.

According to embodiments of the disclosure, the communication module 2010 may be configured to perform communication between the base station device 2000 and other devices. The communication between the base station device 2000 and other devices may include, but not limited to, the communication between the base station device 2000 and individual user devices 3000 (including the master user device and the slave user devices). The communication module 2010 may be applicable to different wireless communication protocols, including but not limited to various cellular communication, Bluetooth, Wi-Fi, and the like.

Preferably, the communication module 2010 may be applicable to the 5G NR communication protocol. Additionally, the communication module 2010 may also be applicable to a wired communication protocol to provide the base station device 2000 with necessary wired communication. The communication module 2010 may be used to receive radio signals transmitted by one or more user devices 3000, may also perform processing such as down-conversion, analog-to-digital conversion, etc. on the received radio signals, and may provide information acquired from the radio signals to other parts of the base station device 2000 (for example, the memory 2020 or the processing circuitry 2030). The communication module 2010 may also be used to transmit radio signals to one or more user devices 3000, and may perform processing such as digital-to-analog conversion, up-conversion, etc. on the radio signals prior to transmission. The information transmitted by the communication module 2010 may come from other parts of the base station device 2000 (for example, the memory 2020 or the processing circuitry 2030). The communication module 2010 may be implemented as, for example, a communication interface component such as an antenna device, a radio frequency circuit, and a part of a baseband processing circuit. The communication module 2010 is drawn with a dashed line, as it may also be located within the processing circuitry 3030 or external to the base station device 2000.

According to embodiments of the disclosure, the memory 2020 of the base station device 2000 may store information generated by the processing circuitry 3030, information received from other devices through the communication module 2010, programs, machine codes and data for operations of the base station device 2000, and so on. The memory 2020 is drawn with a dashed line, as it may also be located within the processing circuitry 2030 or external to the base station device 2000. Memory 2020 may be a volatile memory and/or a non-volatile memory. For example, memory 2020 may include, but not limited to, a random access memory (RAM), a dynamic random access memory (DRAM), a static random access memory (SRAM), a read only memory (ROM), and a flash memory.

According to embodiments of the disclosure, the processing circuitry 2030 may be used to implement various functions of the base station device 2000. The processing circuitry 2030 may include a device cluster division module 2031, a resource configuration module 2032, a link screening module 2033 and a data relay module 2034. The device cluster division module 2031, the resource configuration module 2032, the link screening module 2033, and the data relay module 2034 are drawn with dashed boxes, as one or more of these modules are optional.

According to embodiments of the disclosure, the processing circuitry 2030 may include a device cluster division module 2031. The device cluster division module 2031 may be configured to divide a plurality of user devices in a communication system into one or more device clusters, each device cluster including a corresponding master user device and one or more slave user devices.

According to embodiments of the disclosure, the device cluster division module 2031 may collect information associated with the plurality of user devices, and divide the plurality of user devices into one or more device clusters and/or update the one or more device clusters based on the collected information.

According to embodiments of the disclosure, the device cluster division module 2031 may also designate a master user device for each device cluster based on the collected information. As a specific example, the device cluster division module 2031 may determine a sum of distances of each user device in each device cluster from other user devices in that device cluster, and select a user device with the smallest sum as the master user device of that device cluster.

According to embodiments of the disclosure, the device cluster division module 2031 may generate and maintain cluster division information, and may transmit the cluster division information to the master user device and/or the slave user devices.

According to embodiments of the disclosure, the processing circuitry 2030 may further include a resource configuration module 2032. The resource configuration module 2032 may be configured to determine resource allocations. The resource configuration module 2032 may also generate resource allocation configuration information that indicates resource allocation, and transmit the generated resource allocation configuration information to the master user device and/or the slave user devices.

According to embodiments of the disclosure, the resource allocation generated by the resource configuration module 2032 may allocate non-competitive resources and competitive resources in a preset grant-free access manner, wherein the non-competitive resources may be allocated to first links between the master user device of the device cluster and slave user devices of that device cluster, and the competitive resources may be allocated to at least second links. The second links include intra-cluster second links among a plurality of slave user devices of a same device cluster and/or inter-cluster second links between user devices belonging to different device clusters.

According to embodiments of the disclosure, the resource configuration module 2032 may be configured to determine, for each device cluster, non-competitive resources that are specific to that device cluster. Optionally, the resource configuration module 2032 may be configured to determine the size of the non-competitive resources allocated to a device cluster based on attributes of the device cluster. The attributes of the device cluster may include Channel Busy Rate (CBR) or the number of user devices included in the device cluster.

According to embodiments of the disclosure, the resource configuration module 2032 may also be configured to adjust the size of the allocated non-competitive resources and competitive resources based on the rate of change of a device cluster. For example, when the rate of change is greater than a threshold, the resource configuration module 2032 may decrease the amount of non-competitive resources and increase the amount of competitive resources.

According to embodiments of the disclosure, the processing circuitry 2030 may further include a link screening module 2033. The link screening module 2033 may be configured to determine whether a link between any two user devices in the plurality of user devices is an active link.

According to embodiments of the disclosure, the link screening module 2033 may be configured to determine whether a link between two user devices is an active link based on the priority of the link. The link screening module 2033 may determine a link with a high priority as an active link.

According to embodiments of the disclosure, the link screening module 2033 may generate active link information. The link screening module 2033 may transmit the active link information to the resource configuration module 2032. The resource allocation module 2032 may allocate non-competitive resources and/or the competitive resources only for active links. This may greatly reduce the number of links participating in resource competition, thereby reducing waiting latency for individual links.

According to embodiments of the disclosure, the processing circuitry 2030 may further include a data relay module 2034. According to embodiments of the disclosure, the data relay module 2034 may be configured to receive a first transmission from a first slave user device of a first device cluster of a plurality of device clusters through a first master user device of the first device cluster, and transmit the received first transmission to a second slave user device of a second device cluster in the plurality of device clusters through a second master user device of the second device cluster. By using the data relay module 2034, the base station device 2000 may act as a routing node in a multi-layer communication link associated with individual slave user devices.

Details about the functions and operations of the base station device will become clearer in the descriptions hereinafter.

3. User Device

Figure 3A:
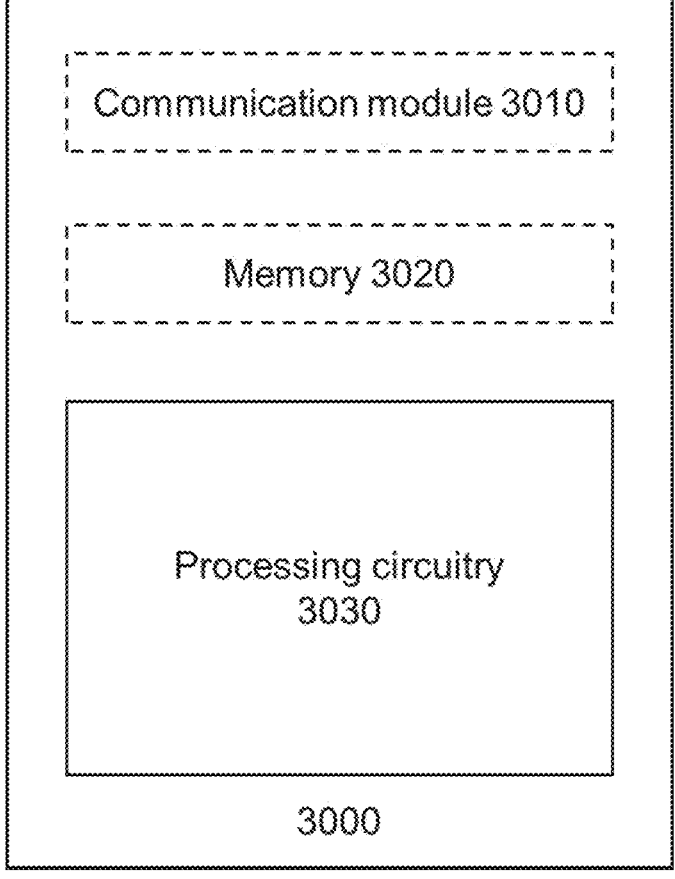
FIG. 3A illustrates a user device according to embodiments of the disclosure.

FIG. 3A illustrates a block diagram of a user device 3000 according to embodiments of the disclosure. An example of the user device 3000 may be any one of the user devices 3000-1 to 3000-8 as described in FIG. 1. According to embodiments of the disclosure, the user device 3000 may include a mobile device, an in-vehicle device, or a terminal that performs machine-to-machine (M2M) communication, and the like. The user device may also be a wireless communication module (such as an integrated circuit module including a single wafer) installed in the above drone, in-vehicle device or terminal.

According to embodiments of the disclosure, the user device 3000 may include a communication module 3010, a storage module 3020, and a processing circuitry 3030.

According to embodiments of the disclosure, the communication module 3010 may be configured to perform communication between the user device 3000 and other devices. The communication between the user device 3000 and other devices may include, but not limited to, the communication between the user device 3000 and the base station device 2000, the communication with a master user device and/or slave user devices in the same device cluster, and the communication with other user devices of different device clusters, etc. Optionally, the communication module 3010 may include different sub-units to implement communication with different devices respectively. According to embodiments of the disclosure, the communication module 3010 may be applicable to different wireless communication protocols, including but not limited to various cellular communication, Bluetooth, Wi-Fi, and the like. Preferably, the communication module 3010 may be adapted to the 5G NR communication protocol. Additionally, the communication module 3010 may also be applicable to a wired communication protocol to provide the user device 3000 with necessary wired communication. According to embodiments of the disclosure, the communication module 3010 may be used to receive radio signals transmitted by the base station device 2000 or another user device 3000, may also perform processing such as down-conversion, analog-to-digital conversion, etc. on the received radio signals, and may provide information acquired from the radio signals to other parts of the user device 3000 (for example, the memory 3020 or the processing circuitry 3030). The communication module 3010 may also be used to transmit radio signals to the base station device 2000 or another user device 3000, and may perform processing such as digital-to-analog conversion, up-conversion, etc. on the radio signals prior to transmission. Information transmitted by communication module 3010 may come from other parts of user device 3000 (for example, memory 3020 or processing circuitry 3030). According to embodiments of the disclosure, the communication module 3010 may be implemented as, for example, a communication interface component such as an antenna device, a radio frequency circuit, and a part of a baseband processing circuit. The communication module 3010 is drawn with a dashed line, as it may also be located within the processing circuitry 3030 or external to the user device 3000.

According to embodiments of the disclosure, the memory 3020 of the user device 3000 may store information generated by the processing circuitry 3030, information received from other devices through the communication module 3010, programs, machine codes and data for operations of the user device 3000, and so on. The memory 3020 is drawn with dashed lines, as it may also be located within the processing circuitry 3030 or external to the user device 3000. Memory 3020 may be a volatile memory and/or a non-volatile memory. For example, memory 3020 may include, but not limited to, a random access memory (RAM), a dynamic random access memory (DRAM), a static random access memory (SRAM), a read only memory (ROM), and a flash memory.

According to embodiments of the disclosure, the processing circuitry 3030 may be used to implement various functions of the user device 3000. According to embodiments of the disclosure, the user device 3000 may act as a master user device (for example, the master user device 3000-4 or 3000-8 described with respect to FIG. 1) or a slave user device (for example, the slave user device 3000-1 to 3000-3 and 3000-5 to 3000-7 described with respect to FIG. 1) in the communication system 1000. Operations performed by the processing circuitry 3030 may be different when acting as a master user device or a slave user device, respectively. According to one embodiment of the disclosure, the processing circuitry 3030 may determine whether the user device 3000 acts as a master user device or a slave user device based on external configurations or instructions, and perform different functions and operations accordingly. The functions of a slave user device and a master user device will be described below, respectively.

3.1. Master User Device

Figure 3B:
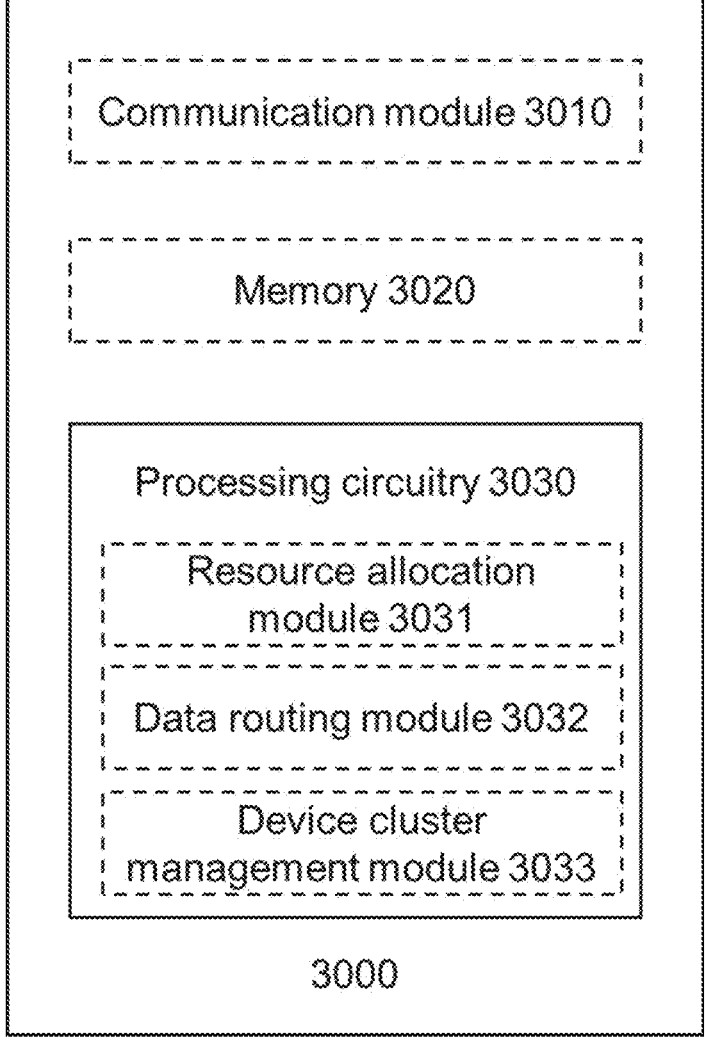
FIG. 3B illustrates a master user device according to embodiments of the disclosure.

According to embodiments of the disclosure, the user device 3000 may be configured to act as a master user device. FIG. 3B illustrates a master user device 3000 according to embodiments of the disclosure.

Compared with FIG. 3A, FIG. 3B further illustrates that the processing circuitry 3030 may include a resource allocation module 3031, a data routing module 3032 and a device cluster management module 3033. The resource allocation module 3031, the data routing module 3032, and the device cluster management module 3033 are drawn with dashed boxes, as one or more of these modules are optional.

As an example, the user device 3000 may be configured as the master user device 3000-4 in FIG. 1. For the sake of clarity and convenience of description, this section will take the master user device 3000-4 as an example for description in conjunction with FIG. 1. It may be understood that the user device 3000 may also be any other master user device. In the example of FIG. 1, the master user device 3000-4 is associated with the the the device cluster A, which also includes one or more slave user devices 3000-1 to 3000-3. The master user device 3000-4 may manage, maintain the device cluster A, and/or participate in resource allocation of the device cluster A.

According to embodiments of the disclosure, the resource allocation module 3031 of the processing circuitry 3030 may perform resource allocation to the device cluster A. Specifically, the resource allocation module 3031 may transmit resource allocation configuration information to each of the slave user devices 3000-1 to 3000-3. The resource allocation configuration information may allocate non-competitive resources to first links between the master user device 3000-4 and each of first slave user devices of the device cluster A in a preset grant-free access manner, and allocate the competitive resources to at least second links, where the second links may include intra-cluster second links among a plurality of slave user devices of the device cluster A and/or inter-cluster second links between the slave user device and other user devices that do not belong to the device cluster A.

According to an embodiment of the disclosure, the resource allocation configuration information may be completely determined by the base station device 2000. The resource allocation module 3031 may be configured to receive the resource allocation configuration information determined by the base station device 2000 and forward it to respective slave user devices 3000-1 to 3000-3. According to another embodiment of the disclosure, the resource allocation configuration information may be jointly determined by the base station device 2000 and the resource allocation module 3031 of the master user device 3000-4 of the device cluster. The resource allocation module 3031 may be configured to transmit the determined resource allocation configuration information to respective slave user devices 3000-1 to 3000-3.

According to embodiments of the disclosure, the processing circuitry 3030 may further include a data routing module 3032. The data routing module 3032 may be configured to route a first transmission associated with respective slave user devices of the device cluster A such that the master user device 3000-4 may act as a routing node in a multi-layer communication link associated with the slave user devices. The data routing module 3032 of the master user device 3000-4 may also route a HARQ message associated with the first transmission. For example, the data routing module 3032 may receive the HARQ message associated with the first transmission and transmit the HARQ message to the slave user device from which the first transmission originated, so as to reduce redundant transmissions in the communication system.

According to embodiments of the disclosure, the processing circuitry 3030 may further include a device cluster management module 3033. The device cluster management module 3033 may maintain cluster information of the device cluster A. The device cluster management module 3033 may also collect information associated with respective slave user devices in the device cluster A, and update the device cluster A based on the collected information. The device cluster management module 3033 may manage the device cluster A jointly with the base station device 2000.

3.2. Slave User Device

Figure 3C:
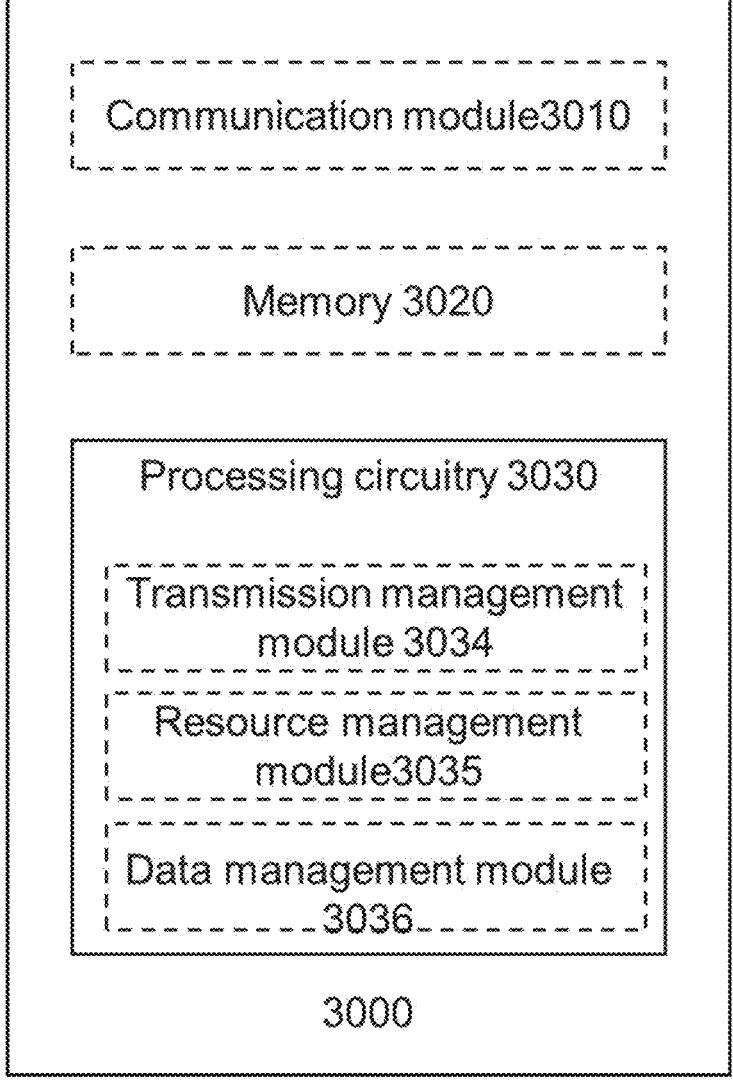
FIG. 3C illustrates a slave user device according to embodiments of the disclosure.

According to embodiments of the disclosure, the user device 3000 may be configured to act as a slave user device. FIG. 3C illustrates a slave user device 3000 according to embodiments of the disclosure.

Compared with FIG. 3A, FIG. 3C further illustrates that the processing circuitry 3030 may include a transmission management module 3034, a resource management module 3035, and a data management module 3036. The transmission management module 3034, the resource management module 3035, and the data management module 3036 are drawn with dashed boxes, as one or more of these modules are optional.

As an example, the user device 3000 may be configured as the slave user device 3000-1 in FIG. 1. For the sake of clarity and convenience of description, this section will take the slave user device 3000-1 as an example for description in conjunction with FIG. 1. In the example of FIG. 1, slave user device 3000-1 is associated with the device cluster A. It may be understood that the user device 3000 may also be other slave user devices associated with any device cluster.

According to embodiments of the disclosure, the transmission management module 3034 of the processing circuitry 3030 may be configured for communication between the slave user device 3000-1 and a second user device in the communication system 1000. Specifically, the transmission management module 3034 may be configured to perform a first transmission with the second user device through the master user device 3000-4 of the device cluster A via a first link, and to perform a direct second transmission with the second user device via a second link. The first transmission may be performed with non-competitive resources, while the second transmission may be performed with competitive resources. As described further hereinafter, the first link may be part of a multi-layer communication link between the user device 3000-1 and the second user device. The multi-layer communication link is used to perform the first transmission. The second link may be a direct link between the slave user device 3000-1 and the second user device for performing the second transmission.

According to embodiments of the disclosure, the multi-layer communication link for performing the first transmission may include different paths, depending on whether the second user device and the slave user device 3000-1 belong to the same the device cluster A.

When both the second user device and the slave user device 3000-1 are associated with the device cluster A, the first transmission may be routed within the cluster through the master user device 3000-4 of this the device cluster A. In this case, performing the first transmission between the slave user device 3000-1 and the second user device may include: transmitting the first transmission by the slave user device 3000-1 to the second user device via the master user device 3000-4 (the slave user device 3000-1 as the transmitter); or, receive the first transmission from the second user device by the slave user device 3000-1 via the master user device 3000-4 (the slave user device 3000-1 as the target recipient).

When the slave user device 3000-1 and the second user device are associated with different device clusters, the first transmission between the slave user device 3000-1 and the second user device may be performed by using the master user device 3000-4, the base station device 2000 and a second master user device associated with the second user device as routing nodes. For example, when the slave user device 3000-1 is the transmitter of the first transmission, the first transmission may be transmitted to the second user device by the slave user device 3000-1 via the master user device 3000-4 associated with the slave user device 3000-1, the base station device 2000, and the second master user device associated with the second user device sequentially. When the slave user device 3000-1 is the target recipient of the first transmission, the slave user device 3000-1 may receive the first transmission originating from the second user device via the master user device 3000-4 associated with the slave user device 3000-1, the base station device 2000, and the second master user device associated with the second user device.

According to embodiments of the disclosure, the processing circuitry 3030 may further include a resource management module 3035. The resource management module 3035 may be configured to receive resource allocation configuration information from at least one of the base station device 2000 or the master user device 3000-4 associated with the slave user device 3000-1.

According to embodiments of the disclosure, the resource allocation configuration information may allocate resources in a preset grant-free access manner, so that execution of the first transmission and the second transmission does not require the slave user device 3000-1 to request a scheduling from the base station device 2000. The resource allocation configuration information may also allocate different types of resources for different types of links. For example, the resource allocation configuration information may allocate non-competitive resources to the first link for the first transmission and allocate competitive resources to at least the second link for the second transmission. Preferably, the non-competitive resources may be device-cluster-specific. Optionally, the competitive resources may comprise at least a portion that device-cluster-specific.

According to embodiments of the disclosure, the resource management module 3035 may allocate respective resources for the first transmission and the second transmission based on the resource allocation configuration information.

According to embodiments of the disclosure, the processing circuitry 3030 may further include a data management module 3036. The data management module 3036 may manage transmissions transmitted from the user device 3000-1 and/or received by the user device 3000-1.

According to embodiments of the disclosure, when the slave user device 3000-1 acts as the transmitter of the first transmission and/or the second transmission, the data management module 3036 may be configured to allocate data with different requirements to the first transmission and/or the second transmission respectively. For example, the data management module 3036 may allocate data with higher reliability requirements or a higher priority to the first transmission. This is because the first link (in particular, the multi-layer communication link) used for the first transmission may have higher reliability. Additionally or alternatively, the data management module 3036 may include a part or all of the first transmission in the second transmission, so that the first transmission and the second transmission constitute redundant transmissions to further ensure the part or all of the data is successfully transmitted.

According to embodiments of the disclosure, when the slave user device 3000-1 is the target recipient and the first transmission and the second transmission constitute redundant transmissions, the data management module 3036 may also be configured to transmit an acknowledgement message, upon successfully receiving and decoding one of the first transmission and the second transmission, so as to terminate transmission of the other one of the first transmission and the second transmission.

It should be noted that although this section describes the user device 3000 in conjunction with the master user device 3000-4 and the slave user device 3000-1 of FIG. 1 respectively, the user device 3000 may also be any other master user device and slave user device. In addition, although functions and respective functional modules of the master user device 3000-4 and the slave user device 3000-1 are described separately in this section, the master user device and the slave user device may be the same kind of user device that may have both the functions of the master user device and the functions of the slave user device described above. The user device may activate respective functional modules based on its role in a device cluster (acting as a master user device or a slave user device). Also, the user device may deactivate respective function modules and activate other function modules based on a change of its role. Activation of a functional module may include executing respective software, computer instructions, and/or enabling respective hardware.

Details regarding the functions and operations of the master user device and the slave user device will become apparent in the further description hereinafter.

It should be noted that the various units described in Sections 2 and 3 with respect to base station device and user device are exemplary and/or preferred modules for implementing the processes described in this disclosure. These modules may be hardware units (such as central processing units, field programmable gate arrays, digital signal processors or application specific integrated circuits, etc.) and/or software modules (such as computer readable programs). The modules used to implement various steps described below are not described in detail above. However, as long as there is a step for executing a certain process, there may be a corresponding module or unit (implemented by hardware and/or software) for implementing the same process. The technical solutions defined by the steps described below and all combinations of units corresponding to these steps are all included in the disclosed content of the disclosure, as long as these technical solutions they constitute are complete and applicable.

Furthermore, devices constituted by various units may be incorporated as functional modules into a hardware device, such as a computer. In addition to these functional modules, the computer may of course have other hardware or software components.

4. Example Configuration Procedures

This section will mainly describe various exemplary configuration procedures related to the disclosure.

Figure 4:
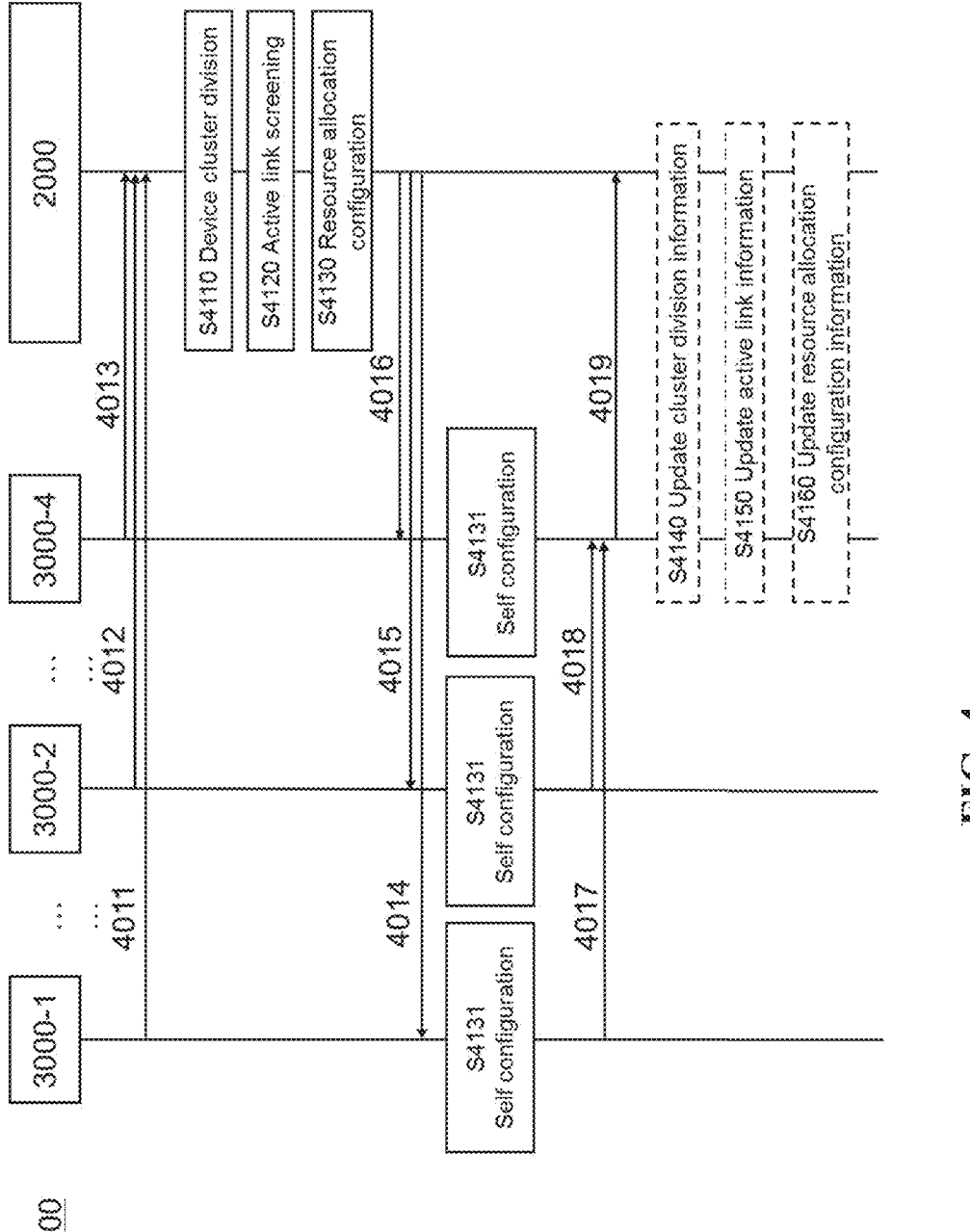
FIG. 4 illustrates a data flow diagram related to a number of exemplary configuration procedures associated with the configuration of the communication system of FIG. 1 according to embodiments of the disclosure.

FIG. 4 illustrates a data flow diagram 4000 that may relate to a number of exemplary configuration procedures associated with the configuration of the communication system 1000, including a device cluster division procedure, a resource allocation configuration procedure, a link screening procedure, etc., according to embodiments of the disclosure. The data flow diagram 4000 also is directed to a procedure for updating these configurations of the communication system. It should be noted that each of these exemplary configuration procedures may involve one or more of the various aspects of the disclosure. One or more of the exemplary configuration procedures may be performed independently as desired without relying on another exemplary configuration procedure.

FIG. 4 illustrates a plurality of user devices 3000-1, 3000-2, 3000-4 and a base station device 2000. As an example, FIG. 4 may have the same multi-layer architecture as illustrated in FIG. 1. However, for the sake of clarity and convenience of description, FIG. 4 only illustrates three user devices, and ellipses are used to denote other possible user devices. The presentation of FIG. 4 is only schematic. Those skilled in the art will understand that FIG. 4 may relate to all user devices depicted in FIG. 1 and may include more or less user devices. The plurality of exemplary configuration procedures associated with the configuration of the communication system described with respect to FIG. 4 may be performed for individual user devices and are not limited to those illustrated in FIG. 4.

Individual exemplary configuration procedures will be described respectively below.

4.1. Device Cluster Division Procedure

According to embodiments of the disclosure, the base station device 2000 may divide a plurality of user devices in a communication system 1000 during the device cluster division procedure, thereby dividing the plurality of user devices into one or more device clusters. In this way, a multi-layer architecture of user devices may be constructed. The device cluster division procedure may be performed, for example, by the device cluster division module 2031 of the base station device 2000 in step S4110.

According to embodiments of the disclosure, the base station device 2000 may collect information associated with the plurality of user devices. The information collected by the base station device 2000 may come from these user devices. For example, each user device may transmit (for example, broadcast) information associated with itself, including but not limited to the location of the user device, direction of movement, speed of movement, functions performed, and the like. As illustrated in FIG. 4, the user devices 3000-1, 3000-2, and 3000-4 may transmit these information to the base station device 2000 through data flows 4011, 4012, and 4013, respectively. Preferably, each user device may also collect information of one or more surrounding user devices, and transmit the collected information to the base station device 2000.

Additionally or alternatively, the base station device 2000 may also collect information from a control device associated with the user devices. For example, the base station device 2000 may collect information associated with each drone from a control device that controls an array of drones. Information associated with each drone may include, but not limited to, the real-time location of the drone, real-time direction of movement, real-time speed of movement, and expected movement plans, among others.

According to embodiments of the disclosure, in step S4110, the base station device 2000 may divide the plurality of user devices into one or more device clusters based on the collected information.

As one specific example, the base station device 2000 may determine and/or predict a distribution of the plurality of user devices based on the collected information. The base station device 2000 may divide into device clusters based on the distribution of the plurality of users. This division method may be applied to scenarios where the user devices are mobile devices (for example, drones, an in-vehicle devices). For example, the base station device 2000 may determine the distribution density of user devices, set a boundary of each device cluster in an area where users are sparsely distributed according to the distribution density of user devices, and set a center of each device cluster in an area where users are densely distributed, thereby roughly dividing user devices into a plurality of device clusters. Further, for a user device located around the boundary of a device cluster, the base station device 2000 may determine the device cluster to which the user device belongs according to the distance between the user device and the center of individual device clusters. For example, if a user device located at the boundary of a device cluster is closest to the center of a specific device cluster, the user device may be divided into that specific device cluster. In this way, the plurality of user devices may be divided into a plurality of relatively concentrated device clusters, so that communication distances between the user devices within the device clusters are short.

As another specific example, the base station device 2000 may determine functions of each user device based on the collected information, and divide device clusters based on the correlation of functions of the plurality of user devices. For example, in an Industrial Internet that contains a plurality of industrial flows, each user device may be associated with a specific industrial flow (for example, molding, painting, assembly, inspection in the automotive industry). The base station device 2000 may divide respective user devices associated with a same industrial flow into a same device cluster.

It should be noted that the respective specific examples above may be combined. In other embodiments, the base station device 2000 may divide device clusters based on other factors, which is not limited to the specific examples given above.

According to embodiments of the disclosure, in step S4110, the base station device 2000 may also determine a master user device for each device cluster. This determination may also be based on information collected by the base station device 2000 associated with the plurality of user devices.

As one specific example, the base station device 2000 may determine a sum of distances of each user device in each device cluster from other user devices in that device cluster, and select a user device with the smallest sum as the master user device for that device cluster. In this way, the master user device of each device cluster may be determined as the user device at the center of the device cluster. This may reduce the total communication distance of the master user device, thereby reducing transmission power of the master user device.

As another specific example, the base station device 2000 may determine a key device among the user devices in each device cluster, and determine the key device as the master user device of the device cluster. For example, in the Industrial Internet, when each device cluster is associated with a specific industrial flow, the master user device of the device cluster may be selected as a key device that manages and/or monitors the specific industrial flow.

It should be noted that above individual specific examples may be combined. In other embodiments, the base station device 2000 may select the master user device of each device cluster based on other factors, which is not limited to the specific examples given above.

In the example of FIG. 4, the base station device 2000 may divide the user devices 3000-1, 3000-2, and 3000-4 into a same device cluster (for example, the device cluster A in FIG. 1), and determine the user device 3000-4 to be the master user device, which is consistent with the example of FIG. 1.

According to embodiments of the disclosure, in step S4110, the base station device 2000 may also generate cluster division information. The cluster division information indicates a variety of information associated with the one or more device clusters. For example, the cluster division information may include cluster information of each device cluster. The cluster information of each device cluster may include an identifier of the device cluster, an identifier of the master user device of the device cluster, identifiers of one or more slave user devices, the number of devices included in the device cluster, and the like. Optionally, the cluster information of each device cluster may further include an area covered by the device cluster. Optionally, the cluster information of each device cluster may further include one or more communication indicators (for example, Channel Busy Rate (CBR)) of the device cluster.

According to embodiments of the disclosure, the base station device 2000 may store and maintain the generated cluster division information, for example, in the memory 2020. The base station device 2000 may also transmit the cluster division information to each user device. In the example of FIG. 4, the cluster division information may be transmitted to user devices 3000-1, 3000-2, and 3000-4 through data flows 4014, 4015 and 4016, respectively. Alternatively, the base station device 2000 may transmit the cluster division information to the master user device (for example, 3000-4) of each device cluster, and the master user device may transmit it to one or more slave user devices (for example, 3000-1, 3000-2) of the device cluster.

After receiving the cluster division information, each user device may store the cluster division information (for example, in memory 3020) and configure itself based on the cluster division information. For example, according to the cluster division information, each user device may come to know the device cluster to which that user device belongs, as well as the master user device of the device cluster and each slave user device. Each user device may also determine the role of the user device in the device cluster (as the master user device or a slave user device) based on the received cluster division information, and may configure its own functions and operations accordingly. As illustrated in FIG. 4, the self-configuration of the user device may take place in step S4131. In step S4131, the user devices 3000-1 and 3000-2 may be configured as slave user devices, the user device 3000-4 may be configured as a master user device, and all the three user devices may be associated with the device cluster A.

Through the device cluster division procedure, user devices in a communication system may be organized into a multi-layer architecture. As described further hereinafter, the multi-layer architecture may be used to implement a multi-layer communication link between two user devices.

4.2 Link Screening Procedure

According to embodiments of the disclosure, the base station device 2000 may screen links among a plurality of user devices in a link screening procedure, thereby determining active links among the plurality of user devices. In a subsequent resource allocation configuration procedure, communication resources may be allocated only for active links, and resources will not be allocated for inactive links temporarily. The link screening procedure may be performed, for example, by the link screening module 2033 of the base station device 2000 in step S4120.

As already described above, for a communication system including a large number of user devices, if a direct link is established and maintained between any two user devices, a huge number of links will be established. These links need to contend for limited resources, and therefore may have low reliability and may incur waiting latency.

According to embodiments of the disclosure, in step S4120, the base station device 2000 may determine whether a link between two user devices in the communication system is an active link. The base station device 2000 may determine whether the link between two user devices is an active link based on the priority of the link. For example, the priority of a link may be based on communication urgency and/or reliability requirements. Links with high communication urgency may be considered to have a high priority. Alternatively or additionally, links with higher reliability requirements may be considered to have a high priority. The base station device 2000 may determine a link with a high priority as an active link.

As one specific example, in the use case of mobile user device (drone networks or car networking), two user devices that are in close proximity may be considered to have high communication urgency. This may be set, for example, to avoid collisions of these mobile devices. In this case, when a distance between two user devices is less than a distance threshold, the base station device 2000 may determine the link between the two user devices as an active link.

In this example, the distance threshold may be determined based on a maximum speed of the user devices and URLLC time requirements. More specifically, if one URLLC communication needs to be completed within time Tk, and the maximum speed of the user devices is Vmax, the distance threshold may be determined as $2TkV_{max}$. The distance threshold is a safe distance at which the two mobile devices moving towards each other at the maximum speed Vmax within the time Tk will not collide. If the distance between the two user devices is less than the distance threshold, the two user devices may need to communicate in order to prevent a collision. Therefore, the direct link between the two devices may be determined to be an active link. If the distance between two user devices is greater than the distance threshold, the direct link between the two devices may be determined as an inactive link. The distance threshold may also be determined in any other manner.

As another specific example, in the Industrial Internet, certain key devices perform management or monitoring functions, and thus may have demanding requirements for communication reliability. In this case, the base station device 2000 may determine links associated with these key devices as active links.

As one optional example, the link screening procedure may refer to cluster division information obtained through the device cluster division procedure. For example, links between the master user device of each device cluster and individual slave user devices of that device cluster (i.e., first links) may always be determined as active links to ensure communication between the master user device and associated slave user devices. Optionally, links among individual slave user devices within each device cluster (intra-cluster second links) may also be determined as active links. For inter-cluster second links, one or more of above determining methods may be applied.

It should be noted that the respective specific examples above may be combined. In other embodiments, the base station device 2000 may determine active links based on other factors, which is not limited to the specific examples given above.

According to embodiments of the disclosure, in step S4120, the base station device 2000 may also generate active link information. The active link information may include link identifiers for individual active links. A link identifier may be determined, for example, based on identifiers of two user devices that are connected by that link. Active link information may be provided to the resource allocation configuration procedure. Preferably, the active link information may be transmitted to individual user devices (for example, through data flows 4014, 4015, 4016). Individual user devices may perform self-configuration in step S4131 based on the received active link information, so as to establish active links without establishing inactive links.

With the link screening procedure, only links with higher priority may be reserved in a communication system, while other links are excluded. This may significantly reduce the number of links between user devices in a communication system without significantly degrading communication quality. The reduction of the number of links may avoid too many links competing for use of limited resources, thereby reducing latency.

4.3. Resource Allocation Configuration Procedure

According to embodiments of the disclosure, the base station device 2000 may allocate non-competitive resources and competitive resources in a preset grant-free access manner during the resource allocation configuration procedure. The resource allocation configuration procedure may be performed, for example, by the resource configuration module 2032 of the base station device 2000 in step S4130.

According to embodiments of the disclosure, in order to determine resource allocation, the base station device 2000 may firstly classify links among individual user devices. Specifically, the base station device 2000 may classify a link between a master user device of each device cluster and a slave user device of that device cluster as a first link, and classify a link between two user devices and other than the first link as a second link. The second link may include a link among a plurality of slave user devices within the same device cluster (referred to as an intra-cluster second link) and a link between a slave user device and a user device within another device cluster (referred to an inter-cluster second link). Here, the user device in the other device cluster may include a master user device or a slave user device of the other device cluster. In the example of FIG. 1, examples of the first link include links 101, 102, 103, 105, 106 and 107. Examples of intra-cluster second links may include direct links between individual slave user devices of the device cluster A, for example link 201. Examples of inter-cluster second links include direct links between individual slave user devices of the device cluster A and individual user devices of the device cluster B, for example, link 205.

According to a preferred embodiment of the disclosure, the base station device 2000 may screen the first links and the second links in combination with active link information obtained during the link screening procedure. For example, when allocating resources, the base station device 2000 may only consider first links and second links that are active links, and not consider first links and second links that are inactive links. That is, the base station device 2000 allocates resources for first links and second links only when the first links and the second links are active links. This may filter out a large number of inactive links and reduce resource contention. When the active link information is updated, resource allocation may also be updated accordingly. In other embodiments, the base station device 2000 may not consider the active link information.

According to embodiments of the disclosure, the base station device 2000 may divide resources available to the communication system into competitive resources and non-competitive resources, and may allocate different types of resources for different types of links. Specifically, the base station device 2000 may allocate non-competitive resources to first links between the master user device of a device cluster and each slave user device of the device cluster, and may allocate competitive resources to at least second links, including intra-cluster second links and inter-cluster second links. In the example of FIG. 4, the base station device 2000 may allocate non-competitive resources for first links between the master user device 3000-4 and each of the slave user devices 3000-1 and 3000-2, while allocating competitive resources for intra-cluster second link between slave user devices 3000-1 and 3000-2. Although FIG. 4 does not show a plurality of device clusters, competitive resources may also be allocated to inter-cluster second links.

Non-competing means that a resource with a certain size is allocated to a small number of (one or more) users, so that these users do not compete when sharing the resource or the expected latency due to contention is below a threshold. The corresponding allocated resource is referred to as a non-competitive resource. In contrast, competing means that a resource with a certain size is allocated to a large number (one or more) of users, so that these users may compete when sharing the resource or the expected latency due to contention is not below the threshold. The corresponding allocated resource is referred to as a competitive resource. Transmissions using non-competitive resources have higher reliability. In addition, transmissions using non-competitive resources also have lower waiting latency as there is no need to wait for idle resources.

According to embodiments of the disclosure, a non-competitive resource allocated by the base station device 2000 may be device cluster-specific. That is, for different device clusters, different non-competitive resources may be allocated, so that user devices in different device clusters will not compete for a same non-competitive resource. For example, the device cluster A and the device cluster B of FIG. 1 may be allocated different non-competitive resources.

According to embodiments of the disclosure, the base station device 2000 may determine a size of a non-competitive resource allocated to a device cluster based on attributes of the device cluster. The size of the resource may refer to the number of resource elements contained in the resource. For example, the size of the non-competitive resource that is specific to each device cluster may be determined based on at least one of the Channel Busy Rate (CBR) or the number of user devices of that device cluster. For example, the size of the non-competitive resource that is specific to each device cluster may be proportional to the number of user devices contained in that device cluster. Therefore, a device cluster containing more user devices may be allocated more non-competitive resources. Additionally or alternatively, the size of the non-competitive resource that is specific to each device cluster may be positively relevant to the channel busy rate of that device cluster. The channel busy rate may indicate a degree of communication busyness within a device cluster, so, for a device cluster with a higher channel busy rate, more non-competitive resources may be allocated.

According to embodiments of the disclosure, competitive resources allocated by the base station device 2000 may include a first competitive resource and a second competitive resource. The first competitive resource may be shared only by intra-cluster second links of each device cluster, or may be referred to as an intra-cluster competitive resource. That is, the first competitive resource is also specific to the device cluster. The second competitive resource may be a public competitive resource, which may be shared by any link, including intra-cluster second links, inter-cluster second links, and even including first links. Preferably, the competing level of an intra-cluster competitive resource may be set to be lower than that of a public competitive resource. Specifically, an intra-cluster competitive resource with a same size may be shared by fewer users than a public competitive resource. This may ensure high reliability and low waiting latency of a intra-cluster multi-layer communication link to a certain extent. This is advantageous, because communication among user devices belonging to the same device cluster is usually more urgent (for example, because individual drones within the same device cluster in a drone network are quite close to each other).

According to embodiments of the disclosure, in step S4130, the base station device 2000 may also generate resource allocation configuration information. The resource allocation configuration information may include various resource allocations specified by the resource allocation configuration procedure. For example, the resource allocation configuration information may associate a resource identifier of each resource element with a corresponding link identifier, thereby instructing a user device to use one or more resource elements associated with the resource identifier when communicating over the link that is identified by the link identifier.

According to embodiments of the disclosure, the base station device 2000 may also transmit the resource allocation configuration information to each user device. In the example of FIG. 4, the resource allocation configuration information may be transmitted to user devices 3000-1, 3000-2 and 3000-4 through data flows 4014, 4015 and 4016, respectively. Alternatively, the base station device 2000 may transmit the resource allocation configuration information to the master user device of each device cluster, which will in turn be transmitted to one or more slave user devices of the device cluster by the master user device.

After receiving the resource allocation configuration information, each user device may store the resource allocation configuration information and configure itself based on the resource allocation configuration information. As illustrated in FIG. 4, the self-configuration of the user device may occur in step S4131. Specifically, a resource management unit of the user device may store the received resource allocation configuration information in a memory. When a transmission management unit of the user device needs to perform the first transmission and/or the second transmission, the resource management unit may retrieve the resource allocation configuration information. The resource management unit may provide information related to the retrieved corresponding resource to the transmission management unit, so that the transmission management unit may perform the transmission using the corresponding resource. The user device does not need to request scheduling from the base station device and/or the master user device.

In the above various embodiments, resource allocation configuration information may be determined solely by the base station device 2000. According to an alternative embodiment of the disclosure, the resource allocation configuration information may also be jointly determined by the base station device 2000 and master user devices of individual device clusters. The resource allocation configuration information of a device cluster may be determined jointly by the resource configuration module 2032 of the base station device 2000 and the resource allocation module 3031 of the master user device. For example, the base station device 2000 may first determine the division of non-competitive resources and competitive resources among resources available to the communication system, and determine the allocation of the resources among individual device clusters (i.e., determine individual device cluster-specific resources). The base station device 2000 may generate initial resource allocation configuration information indicating such allocation and transmit the information to the master user device of each device cluster. The master user device of each device cluster may further specify the allocation of the resources that are specific to that device cluster among individual links of the device cluster based on the received initial resource allocation configuration information. The master user device may generate final resource allocation configuration information, and transmit the final resource allocation configuration information to individual slave user devices in the device cluster. This resource allocation manner may reduce communication overhead between the master user device and the base station device, and may improve flexibility of resource allocation.

With the resource allocation configuration procedure, a preset grant-free access manner is achieved. In the conventional grant-access method, a user device needs to transmit a scheduling request to a base station before each communication, and only after the base station has allocated communication resources to the user device and informs the user device, the user device can use the allocated communication resources to complete the communication. The scheduling procedure between the user device and the base station is complex, and the scheduling latency may be too long to meet the URLLC service requirements. In contrast, in the preset grant-free access manner of the present disclosure, the user device is pre-allocated with resources, and the resource allocation is stored at the user device in the form of the resource allocation configuration information. The resource allocation configuration information may remain stable for a period of time. As a result, when the user device needs to perform transmission with other user devices, the user device does not need to transmit a scheduling request to the base station, instead it may utilize the pre-allocated resources (non-competitive resources and/or competitive resources) based on the existing resource allocation configuration information to complete transmission. Compared with the conventional grant-access method, the preset grant-free access manner may significantly reduce the signaling overhead associated with resource allocation, thereby reducing latency for the user device.

With the resource allocation configuration procedure, different types of resources may be allocated for different types of links. As part of the multi-layer communication link, individual first links will be able to use the non-competitive resources. Since the multi-layer communication link is allocated sufficient resources, this link may have high reliability. Due to inclusion of a plurality of links, the multi-layer communication link may have certain transmission latency. By allocating non-competitive resources to the multi-layer communication link, waiting latency caused by waiting for idle resources may at least be avoided or reduced, so that the total communication latency of the multi-layer communication link may be limited to a certain level. The second link is allocated competitive resources, the communication reliability of which may be lower than that of the multi-layer communication link. However, as a direct link, the second link has short transmission latency, so the total latency of the second link may also be limited to a certain level. The multi-layer communication link has different characteristics than that of the second link, and they may be complementary. These two links may be used in combination in a hybrid access mode for communication to meet the requirements of high reliability and low latency.

It should be noted that although the device cluster division procedure, the link screening procedure, and the resource allocation configuration procedure are described in FIG. 4 sequentially, this is only exemplary. These procedures may be performed in a different order. For example, the device cluster division procedure and the link screening procedure may be relatively independent. Therefore, the link screening procedure may be performed before the device cluster division procedure, or the two procedures may be performed simultaneously.

Furthermore, although the data flows 4014, 4015 and 4016 are used to represent the transmissions of the cluster division information, the active link information and the resource allocation configuration information from the base station device 2000 to respective user devices, it is understood that these information do not have to be transmitted together, but may be transmitted separately and at different times. Accordingly, the self-configuration of the user device described with respect to step S4131 may also occur separately based on these pieces of information.

With the device cluster division procedure, the link screening procedure and the resource allocation configuration procedure, the plurality of user devices in the communication system may be constructed into a multi-layer architecture, which has a reduced number of links, and in which different types of links are allocated different types of resources. Individual user devices in the multi-layer architecture may use a plurality of links for communication, each of which uses different types of resources, which helps to improve the reliability of communication and reduce latency of communication. Individual communication procedures of the user device are further described in Section 6.

4.4. Update Procedure

According to embodiments of the disclosure, update steps S4140, S4150, and S4160 may be further performed to update the cluster division information, the active link information, and the resource allocation configuration information, respectively. One or more of the updating steps S4140, S4150, S4160 may be optional and are therefore illustrated in dashed boxes.

According to embodiments of the disclosure, the updating steps S4140, S4150, S4160 may be performed based on the collected information about the user device. In the example of FIG. 4, individual slave user devices 3000-1 and 3000-2 may transmit the information associated with the user device to the master user device 3000-4 of the device cluster through data flows 4017, 4018. The master user device 3000-4 may process the received data, and transmit the processed information to the base station device 2000, as illustrated in data flow 4019. Data flows 4017, 4018 and 4019 may occur periodically at certain time intervals. Optionally, individual slave user devices may transmit the information directly to the base station device 2000.

According to embodiments of the disclosure, in step S4140, the cluster division information may be updated by the base station device 2000 (specifically, the device cluster division module 2031). For example, based on the information collected from respective slave user devices, the base station device 2000 may detect a change in the location of each slave user device, and may divide a slave user device whose location change is large enough into a new device cluster. The base station device 2000 may update the cluster division information, and transmit the updated cluster division information to respective master user devices. Each master user device may transmit the received updated cluster division information to corresponding slave user devices.

According to an alternative embodiment of the disclosure, in step S4140, the cluster division information may be updated jointly by the base station device 2000 (specifically, the device cluster division module 2031) and the master user device (specifically, the device cluster management module 3033). For example, the master user device of the device cluster may determine device change information (for example, removal from user device) of the device cluster. Specifically, based on the information collected from individual slave user devices of the device cluster, the master user device of the device cluster may detect the change of the location of each slave user device, and may remove, from the device cluster, a user device whose location change is large enough. The master user device may report such a removal to the base station device 2000 as device change information, and the base station device 2000 may in turn determine a new device cluster for the removed slave user device. The base station device 2000 may update the cluster division information, and transmit the updated cluster division information to individual master user devices. Each master user device may transmit the updated cluster division information to corresponding slave user devices. In this way, the master user device only reports device change information instead of complete cluster information, so communication overhead may be saved.

According to a preferred embodiment of the disclosure, instead of transmitting the updated cluster division information, the base station device 2000 may transmit the difference between the updated cluster division information and the previous cluster division information, referred to as cluster change information. Each user device may determine the updated cluster division information based on the stored previous cluster division information and the cluster change information. This helps to save communication overhead of the communication system, especially for a communication system with frequent device cluster changes.

According to a preferred embodiment of the disclosure, when determining whether a user device has left a device cluster, the master user device and/or the base station device may only focus on locations of slave user devices at the boundary of the device cluster, rather than locations of all of user devices of the device cluster. In the URLLC-mMTC scenario, even if massive user devices served by the base station device are in a high-speed moving state, the change of relative locations between the user devices may be slow. Therefore, device clusters of most slave user devices do not change frequently. Most part of the cluster division information may not need to be updated frequently. Only device clusters to which slave user devices at the boundary belong may change rapidly. Therefore, the master user device and/or the base station device may only focus on locations of slave user devices at the boundary, so that the update of cluster division information may be determined with less computing resources.

According to embodiments of the disclosure, the base station device 2000 may update master user devices of device clusters after the division of device clusters has changed significantly, and/or update master user devices of the device clusters in response to state changes of the master user devices (for example, the battery level is lower than a threshold). Preferably, when a new master user device needs to be selected to replace current master user device, the base station device 2000 may select the new master user device from the same device cluster of the current master user device, which may reduce change of the multi-layer architecture.

According to embodiments of the disclosure, in step S4150, the active link information may be updated by the base station device 2000 (specifically, the link screening module 2033). For example, the base station device 2000 may perform again the link screening procedure as described above, thereby determining new active link information. The base station device 2000 may compare to obtain differences between the new active link information and the previous active link information. When the differences exceed a threshold (for example, a threshold number of active links are re-determined as inactive links, or a threshold number of inactive links are re-determined as active links), the base station device 2000 may transmit the new active link information to individual master user devices. Each master user device may transmit the new active link information to respective slave user devices. Individual user devices may reconfigure themselves based on the new active link information. In this way, the update is not made unless the change of the active link information is large enough, which maintains stability of the active link information.

According to embodiments of the disclosure, in step S4160, the resource allocation configuration information may be updated by the base station device 2000 (specifically, the resource configuration module 2032) and/or the master user device (specifically, the resource allocation module 3031). For example, the base station device 2000 and/or the master user device may update the resource allocation configuration information in response to changes in the cluster division information. The resource allocation configuration information may be updated based on changes in device clusters, thereby changing resources allocated to the changed device clusters. The base station device 2000 and/or the master user device may only transmit the changed part of the updated resource allocation configuration information as compared to the previous resource allocation configuration information, instead of transmitting the entire updated resource allocation configuration information.

According to embodiments of the disclosure, relative sizes of allocated non-competitive resources and competitive resources may be determined based on the rate of change of device clusters. Specifically, the resource configuration module 2032 of the base station device 2000 may determine the rate of change of a plurality of device clusters. The rate of change may be based on the magnitude of the change per unit time (for example, the number of device clusters that have changed per unit time, the amplitude of the change per device cluster, etc.). When the rate of change is greater than a threshold, it means that the multi-layer architecture in the communication system may not be stable. Accordingly, the resource configuration module 2032 may allocate more resources among resources available to the communication system as competitive resources, and allocate fewer resources as non-competitive resources. This avoids a situation where the non-competitive resources are wasted and the competitive resources are too few.

According to embodiments of the disclosure, one or more of the update steps S4140, S4150, and S4144 may be performed periodically at a certain time interval, or performed in response to a trigger condition. It should be noted that although the update steps S4140, S4150, S4144 are described in FIG. 4 sequentially, this is only exemplary. These steps may be independent of each other and performed in a different order. One or more of the update steps S4140, S4150 and S4144 may be performed.

5. Exemplary Resource Allocation

Figure 5A:
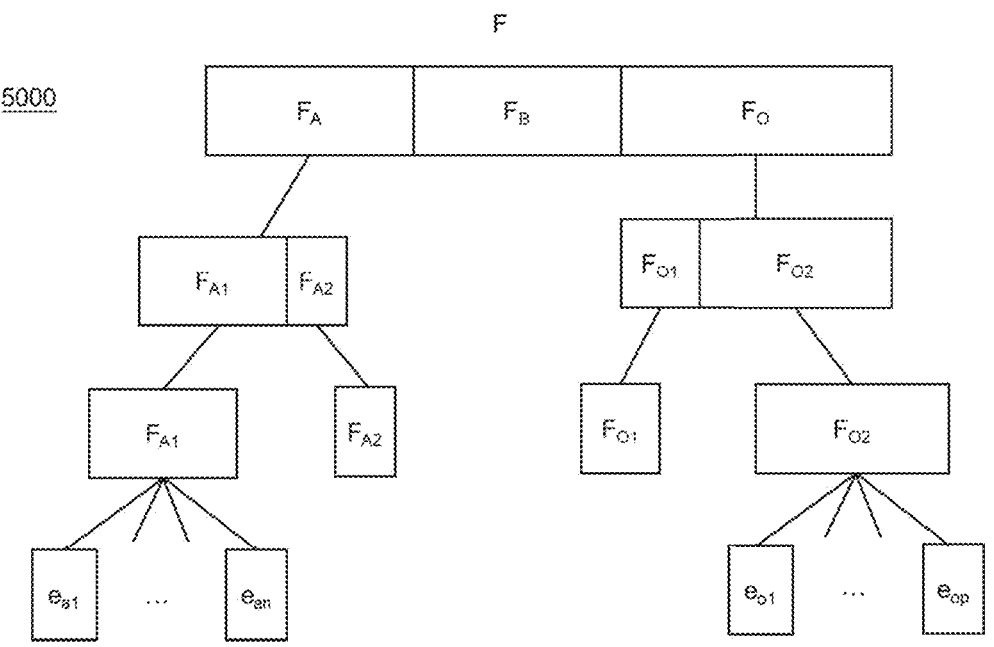
FIG. 5A illustrates an exemplary resource allocation according to embodiments of the disclosure.
Figure 5B:
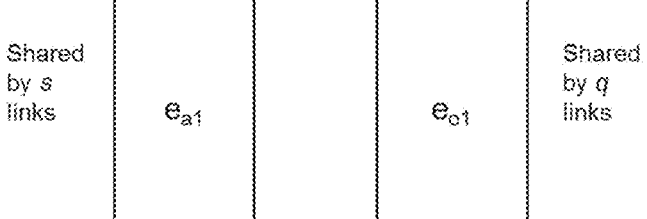
FIG. 5B illustrates a schematic diagram of a resource element according to the disclosure.

Turning now to FIGS. 5A-5B. FIG. 5A illustrates an exemplary resource allocation 5000 according to embodiments of the disclosure. The resource allocation 5000 may be determined by the base station device 2000 and/or the master user device in steps S4130 and/or S4160, and may be included in the resource allocation configuration information.

According to embodiments of the disclosure, resources that may be used for communication between user devices in the communication system may be represented as resource block F. Resource allocation 5000 may divide resource block F into M+1 primary resource blocks, where M is the number of device clusters included in the communication system. This division may be made by the base station device 2000. The M primary resource blocks may include one public resource block and M device cluster-specific resource blocks. As illustrated in FIG. 5, for the exemplary communication system 1000 of FIG. 1, the resource block F may be divided into 3 primary resource blocks, namely, the public resource block $F_O$, the resource block $F_A$ that is specific to the device cluster A, and the resource block $F_B$ that is specific to the device cluster B.

According to embodiments of the disclosure, sizes of the resource block $F_A$ and the resource block $F_B$ may be determined based on the number of user devices included in the device cluster A and the device cluster B. For example, sizes of the resource block $F_A$ and the resource block $F_B$ may be proportional to the number of user devices included in the device cluster A and the device cluster B, respectively. In this example, sizes of the resource block $F_A$ and the resource block $F_B$ may be equal, because both the device cluster A and the device cluster B in FIG. 1 contain four user devices.

According to embodiments of the disclosure, each primary resource block may be further divided. In one embodiment, the resource block $F_A$ specific to the device cluster A may be further divided into a non-competitive resource block $F_{A1}$ and an intra-cluster competitive resource block $F_{A2}$. This division may be made by the base station device 2000 and/or the master user device 3000-4 of the device cluster A. The non-competitive resource block FA1 may include a plurality of resource elements $e_{a1}$ to $e_{an}$. The intra-cluster competitive resource block $F_{A2}$ may also include one or more resource elements (not shown). The non-competitive resource block $F_{A1}$ may be shared by first links between individual slave user devices 3000-1 to 3000-3 in the device cluster A and the master user device 3000-4. The intra-cluster competitive resource block $F_{A2}$ may be shared by intra-cluster second links between individual slave user devices 3000-1 to 3000-3 in the device cluster A.

Similarly, the resource block $F_B$ specific to the device cluster B may be further divided into a non-competitive resource blocks $F_{B1}$ and an intra-cluster competitive resource block $F_{B2}$ (not shown). This division may be made by the base station device 2000 and/or the master user device 3000-8 of the device cluster B. The non-competitive resource block $F_{B1}$ may be shared by first links between individual slave user devices 3000-5 to 3000-7 in the device cluster B and the master user device 3000-8. The intra-cluster competitive resource block $F_{B2}$ may be shared by intra-cluster second links between individual slave user devices 3000-5 to 3000-7 in the device cluster B.

According to an alternative embodiment of the disclosure, the resource block $F_A$ and/or the resource block $F_B$ may also not be further divided. In this case, the resource block $F_A$ may be entirely used as a non-competitive resource block, that is, $F_A = F_{A1}$. In addition, the resource block $F_B$ may also be entirely used as a non-competitive resource block, that is, $F_B = F_{B1}$ According to embodiments of the disclosure, the public resource block $F_O$ may be a competitive resource block, which may be used by any link via contention. Links that may use the public resource block $F_O$ may include at least inter-cluster second links. In the case that an intra-cluster public resource block of a device cluster is insufficient to meet the demand of intra-cluster second links of the device cluster, the intra-cluster second links may also compete to use the public resource block $F_O$. Even first links of the device cluster may compete to use the public resource block $F_O$, if the non-competitive resources of the device cluster are insufficient to meet the needs of first links.

According to a preferred embodiment of the disclosure, in order that the first links may face lower competition when using the public resource block $F_O$, the public resource block $F_O$ may be further divided into a first public resource block $F_{O1}$ and a second public resource block $F_{O2}$. The first public resource block $F_{O1}$ may be configured to be used only by first links within individual device clusters via contention, while the second public resource block $F_{O2}$ may be configured to be used by individual second links via contention. FIG. 5 exemplarily illustrates resource elements $e_{O1}$ to $e_{OP}$ included in the resource block $F_{O2}$. The first public resource block $F_{O1}$ may have a lower competing level than the second public resource block $F_{O2}$. This approach may further ensure that the first links always have sufficient resources (even for competitive resources). This embodiment is preferred but not necessary.

FIG. 5B illustrates a schematic diagram of resource elements $e_{a1}$ and $e_{O1}$ according to the disclosure. In the case that one resource element may serve s communication links without interference, in order to ensure that sufficient resources are allocated to the first links, no more than s first links will use this one resource element together. Due to limited resources and a large number of the second links, the number of second links served by each one resource element will be much larger than s, that is, some second links will not be able to have real-time access, but need to wait for an idle resource element. As illustrated in FIG. 5B, the resource elements illustrated may include a resource element $e_{a1}$ as part of the non-competitive resource block $F_{A1}$ and a resource element $e_{O1}$ as part of the competitive resource block $F_{O2}$. The resource elements $e_{a1}$ and $e_{O1}$ may have the same size. The resource element $e_{a1}$ may be configured to be shared by only k links (specifically, the first links), while the resource element $e_{O1}$ may be configured to be shared by q links. The number k may be less than or equal to s, such that the resource element $e_{a1}$ is not competed by the k links sharing it. The number q may be greater than s, such that resource element $e_{O1}$ is competed by the q links sharing it.

According to embodiments of the disclosure, resources are preferentially allocated to the first links, thereby ensuring that a maximum number of multi-layer communication links may achieve reliable communication. The remaining resources may be allocated to the second links. In this way, it may be ensured that at least one reliable transmission link (i.e., a multi-layer communication link) exists between two user devices, thereby improving communication reliability. As a direct link between two user devices, the second link may provide communication with short latency. It should be noted that the resource allocations illustrated in FIGS. 5A-5B are merely schematic. In other embodiments, other resource allocations may also be employed.

6. Exemplary Communication Procedures

Figure 6:
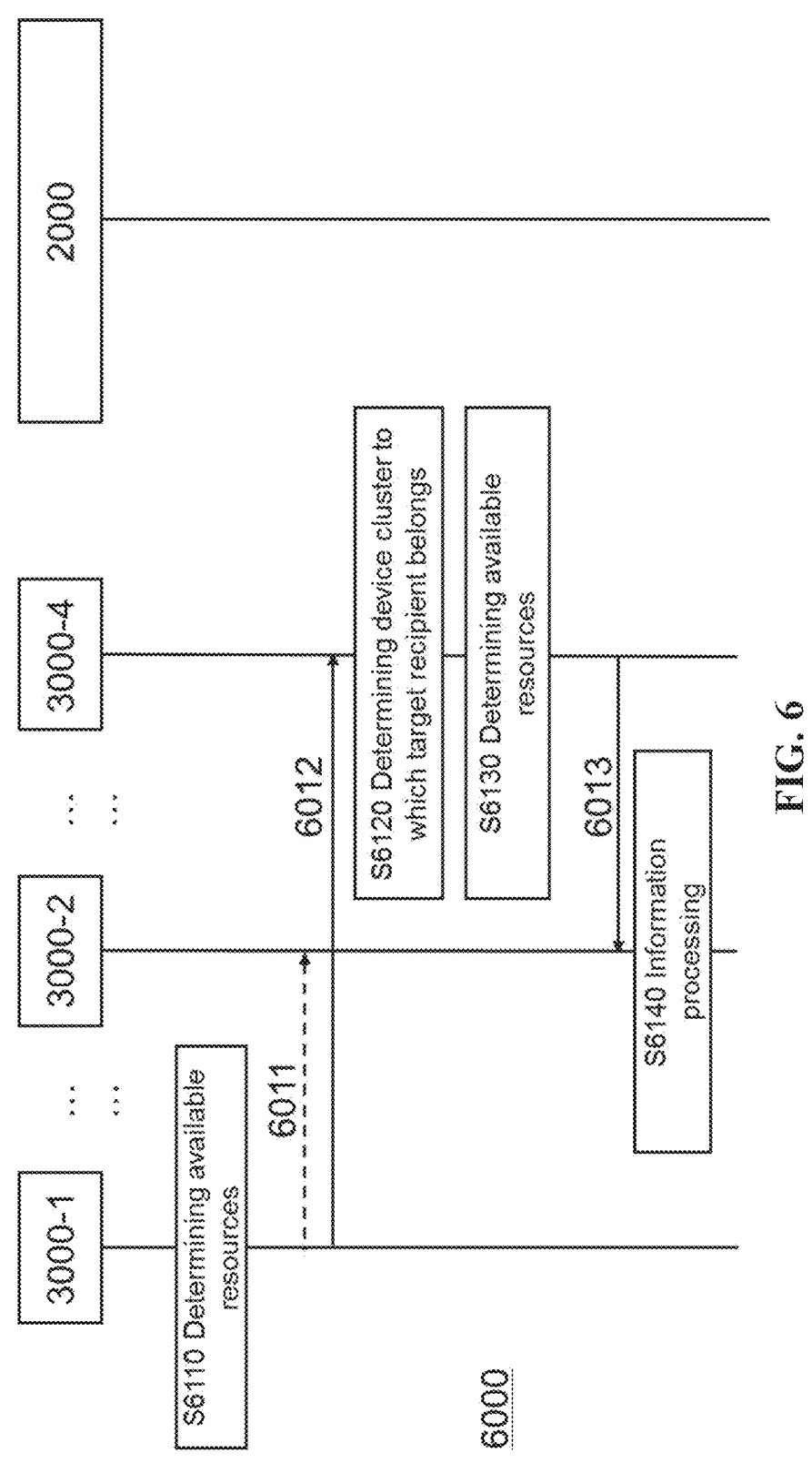
FIG. 6 illustrates a data flow diagram of intra-cluster communication in a hybrid access mode according to embodiments of the disclosure.
Figure 7:
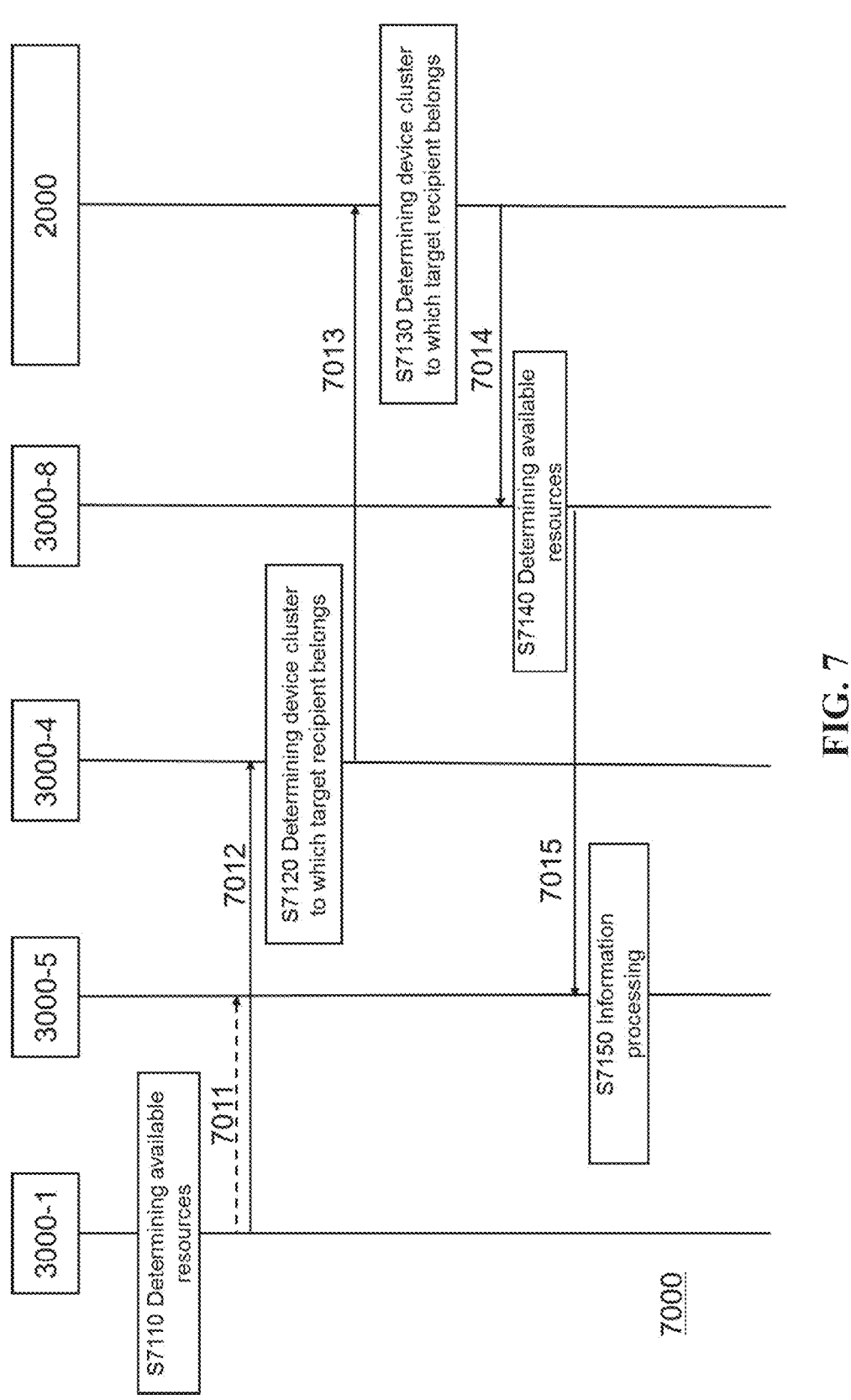
FIG. 7 illustrates a data flow diagram of inter-cluster communication in a hybrid access mode according to embodiments of the disclosure.

Turning now to FIGS. 6 and 7. FIGS. 6 and 7 illustrate a hybrid access mode according to embodiments of the disclosure. Specifically, FIG. 6 illustrates a data flow diagram of intra-cluster communication according to embodiments of the disclosure, and FIG. 7 illustrates a data flow diagram of inter-cluster communication according to embodiments of the disclosure. FIGS. 6 and 7 are described in conjunction with the example of the multilayer architecture illustrated in FIG. 1.

6.1 Intra-Cluster Communication

FIG. 6 illustrates a data flow diagram 6000 for intra-cluster communication in a hybrid access mode according to embodiments of the disclosure. FIG. 6 illustrates the master user device 3000-4 and the slave user devices 3000-1 and 3000-2 belonging to the same the device cluster A, and additionally illustrates the base station device 2000.

In the example of FIG. 6, the slave user device 3000-1 of the device cluster A may transmit one or more transmissions to another slave user device 3000-2 of the device cluster A, and the one or more transmissions may include a first transmission and a second transmission. The first transmission may be performed through a multi-layer communication link including a first link, and the second transmission may be performed through an intra-cluster second link between the slave user device 3000-1 and the slave user device 3000-2.

In step S6110, the slave user device 3000-1 may determine resources used for the first transmission and the second transmission, respectively. This determination may be performed by the resource management module 3035 of the slave user device 3000-1 based on the resource allocation configuration information. For example, the resource management module 3035 may determine a link identifier of the first link (for example, link 101 in FIG. 1) associated with the slave user device 3000-1, and may determine a link identifier of the second link between the slave user device 3000-1 and the slave user device 3000-2. Then, the resource management module 3035 may retrieve the resource allocation configuration information based on the determined two identifiers, so as to obtain a resource identifier of a resource element corresponding to the first link and a resource identifier of a resource element corresponding to the second link. The resource management module 3035 may transmit the obtained resource identifiers to the transmission management module 3034 of the slave user device 3000-1. The transmission management module 3034 may perform the first transmission and the second transmission using the resource elements corresponding to the obtained resource identifiers. As described above, resource elements allocated to the first transmission may belong to non-competitive resources, while resource elements allocated to the second transmission may be competitive resources. It should be noted that resources for the first and second transmissions do not have to be determined at the same time, but may be determined separately.

As illustrated in data flow 6011, the slave user device 3000-1 may perform the second transmission directly through a second link between the slave user device 3000-1 and the slave user device 3000-2. The second link is, for example, the link 201 illustrated in FIG. 1. The second transmission may be performed using the competitive resource as determined in step S6110. In some embodiments, the competitive resource may be part of the intra-cluster competitive resource block $F_{A2}$ described with respect to FIG. 5. If there are no free resources available in the current intra-cluster competitive resource block $F_{A2}$, the second transmission may wait for free resources in the intra-cluster competitive resource block $F_{A2}$. Or, the second transmission may use the public resource block $F_O$. If there are also no free resources available in the current public resource block $F_O$, the second transmission may wait for free resources in the public resource block $F_O$. Once a free resource appears in the intra-cluster competitive resource block $F_{A2}$ or the public resource block $F_O$, the free resource may be used to perform the second transmission. In other embodiments, there may be no intra-cluster competitive resource block that is device cluster-specific (for example, $F_{A2}$). In this case, the competitive resource allocated to the second transmission may be part of the public resource block $F_O$.

It may be seen that the second transmission is performed over a direct link between the slave user device 3000-1 and the slave user device 3000-2. The direct link has a short transmission path without intermediate routing nodes. Therefore, the second transmission may have short transmission latency.

As illustrated in data flow 6012, the slave user device 3000-1 may further perform the first transmission through a first link between the slave user device 3000-1 and the master user device 3000-4, thereby transmitting the first transmission to the master user device 3000-4. The first link is, for example, link 101 in FIG. 1. The first transmission may be performed using the non-competitive resource as determined in step S6110. This non-competitive resource is, for example, part of the non-competitive resource block $F_{A1}$ described with respect to FIG. 5.

The master user device 3000-4 receiving the first transmission may act as a routing node for the first transmission to transmit it to a target recipient. This function may be performed, for example, by the data routing module 3032 of the master user device 3000-4.

In step S6120, the master user device 3000-4 may determine the device cluster to which the target recipient of the first transmission belongs. Specifically, the master user device 3000-4 may determine whether the target recipient is in the same device cluster (i.e., the device cluster A) as the master user device 3000-4. For example, the master user device 3000-4 may retrieve cluster information of the device cluster A it maintains to determine whether the cluster information includes a device identifier of the target recipient. If the master user device 3000-4 determines that the target recipient is in the device cluster A, the master user device 3000-4 may proceed to perform step S6130. In the example of FIG. 6, the target recipient is the slave user device 3000-2, which is in the device cluster A. Therefore, the data flow diagram 6000 of FIG. 6 may proceed to step S6130.

In step S6130, the master user device 3000-4 may be used to determine resources for transmitting the first transmission to the slave user device 3000-2. Similar to step S6110, the master user device 3000-4 may determine, based on a link identifier of the first link (for example, link 102 in FIG. 1) associated with the slave user device 3000-2 and the resource allocation configuration information, resources to be used. Since the first link will be used for this transmission, the resource used will be a non-competitive resource. The non-competitive resource is, for example, part of the non-competitive resource block $F_{A1}$ described with respect to FIG. 5.

After determining the non-competitive resource to be used, the data routing module 3032 of the master user device 3000-4 may use the non-competitive resource to transmit the first transmission to the slave user device 3000-2 through the first link between the master user device 3000-4 and the slave user device 3000-2 (link 102), as illustrated by data flow 6013.

In step S6140, the slave user device 3000-2 may perform information processing on the received first transmission and/or the second transmission. Information processing may include analog processing and digital processing, such as demodulation and decoding, among others. Preferably, the slave user device 3000-2 may further transmit an acknowledgement message (not shown) to the slave user device 3000-1, after successfully decoding one or both of the first transmission and the second transmission.

It should be noted that, for the first transmission indicated by arrows S6012 and S6013, the allocated non-competitive resources (for example, the non-competitive resource block $F_{A1}$) may be first used. If there are currently no free resources available in the non-competitive resource block $F_{A1}$, the first transmission may wait for free resources in the non-competitive resource block $F_{A1}$. Or, the first transmission may use the public resource block $F_O$. For example, the first transmission may use the first public resource block $F_{O1}$ reserved for the first link in the public resource block $F_O$. If there are still no free resources currently available in the first public resource block $F_{O1}$, the first transmission may use the second public resource block $F_{O2}$. Once a free resource appears in $F_{A1}$, $F_{O1}$, or $F_{O2}$, the free resource may be used to perform the first transmission. For the first transmission, the selection priority of individual resource blocks $F_{A1}$, $F_{O1}$, or $F_{O2}$ decreases in sequence, while the competing level increases in sequence. In other embodiments, there may be no resource block $F_{O1}$ reserved for the first link.

In the example of FIG. 6, intra-cluster communication is achieved through two links. The intra-cluster communication includes the first transmission and the second transmission from one slave user device 3000-1 to another slave user device 3000-2. These two links include a multi-layer communication link (links 101 and 102) for the first transmission and a second link (link 201) for the direct second transmission. The multi-layer communication link for the first transmission has only the master user device (user device 3000-4) of the device cluster as a routing node.

It should be noted that, the example of FIG. 6 is merely schematic. As another example, the transmitter may be user device 3000-2, and the target recipient may be user device 3000-1. Also, for one transmitter, there may be a plurality of target recipients. One target recipient may also receive transmissions from a plurality of transmitters.

Furthermore, it should also be noted that the order of the data flow 6011 and the data flows 6012, 6013 illustrated in FIG. 6 does not mean that the second transmission is necessarily performed before the first transmission. The first transmission and the second transmission may be performed in any order, and may also be performed simultaneously. In order to distinguish the first transmission from the second transmission, the data flow representing the second transmission is illustrated in FIG. 6 with dashed lines.

It should be noted that, if the master user device 3000-4 determines in step S6120 that the target recipient is not within the device cluster A, the inter-cluster communication described with respect to FIG. 7 may be performed. This will be described further below in conjunction with FIG. 7.

6.2. Inter-cluster Communication

FIG. 7 illustrates a data flow diagram 7000 for inter-cluster communication in the hybrid access mode according to embodiments of the disclosure. FIG. 7 illustrates the master user device 3000-4 and the slave user device 3000-1 belonging to the device cluster A and the master user device 3000-8 and the slave user device 3000-5 belonging to the device cluster B, and also illustrates the base station device 2000.

In the example of FIG. 7, the slave user device 3000-1 of the device cluster A may transmit one or more transmissions to another slave user device 3000-5 of the device cluster B, and the one or more transmissions may include a first transmission and a second transmission. The first transmission may be performed through a multi-layer communication link including a first link, and the second transmission may be performed through an inter-cluster second link between the slave user device 3000-1 and the slave user device 3000-5.

In step S7110, the slave user device 3000-1 may determine resources used for the first transmission and the second transmission, respectively. Step S7110 may be similar to step S6110. The difference between steps S7110 and S6110 is that, since the second link between the slave user device 3000-1 and the slave user device 3000-5 is an inter-cluster second link, competitive resources used for the second transmission may belong to the public resource block $F_O$, instead of the intra-cluster competitive resource $F_{A2}$.

As illustrated in data flow 7011, the slave user device 3000-1 may perform the second transmission directly through the second link between the slave user device 3000-1 and the slave user device 3000-5. The second link is, for example, link 205 illustrated in FIG. 1. The second transmission may be performed using the competitive resource determined in step S7110. Except for the determined resources for the second transmission and the second link used, the second transmission represented by the data flow 7011 is generally similar to the second transmission represented by the data flow 6011, so details are not repeated here.

As illustrated in data flow 7012, the slave user device 3000-1 may further perform the first transmission through the first link between the slave user device 3000-1 and the master user device 3000-4, thereby transmitting the first transmission to the master user device 3000-4. The first transmission represented by data flow 7012 may be the same as the first transmission represented by data flow 6012.

The master user device 3000-4 receiving the first transmission may act as a routing node for the first transmission to transmit it to a target recipient. This function may be performed, for example, by the data routing module 3032 of the master user device 3000-4.

In step S7120, the master user device 3000-4 may determine the device cluster to which the target recipient of the first transmission belongs. Specifically, the master user device 3000-4 may determine whether the target recipient is in the same device cluster (i.e., the device cluster A) as the master user device 3000-4. Similar to step S6120, the master user device 3000-4 may retrieve cluster information of the device cluster A it maintains to determine whether the cluster information includes a device identifier of the target recipient. If the master user device 3000-4 determines that the target recipient is not within the device cluster A, the master user device 3000-4 may transmit the first transmission to the base station device 2000 for further routing by the base station device 2000. In the example of FIG. 7, the target recipient is the slave user device 3000-5, which is located in a different the device cluster B than the device cluster A. Therefore, the data flow diagram 7000 of FIG. 7 may proceed to the data flow 7013. The master user device 3000-4 routes the first transmission to the base station device 2000 through the data flow 7013. The link traversed by the data flow 7013 is, for example, the link 104 in FIG. 1.

The base station device 2000 receiving the first transmission may route the first transmission towards the target recipient. This function may be performed by, for example, the data relay module 2034 of the base station device 2000.

In step S7130, the base station device 2000 may determine the device cluster to which the target recipient of the first transmission belongs. For example, the base station device 2000 may retrieve the cluster division information it maintains to determine the device cluster to which the target recipient belongs, and may also determine the master user device of that device cluster. In the example of FIG. 7, the base station device 2000 may determine that the target recipient (slave user device 3000-5) belongs to the device cluster B, and the master user device of that device cluster is the user device 3000-8. Accordingly, base station device 2000 may route the first transmission to the master user device 3000-8, as illustrated by data flow 7014. The link traversed by data flow 7014 is, for example, link 108 in FIG. 1.

It should be noted that links associated with the data flows 7013 and 7014 belong to links between the base station device 2000 and user devices, which do not belong to the first link or the second link between the user devices. Optionally, resources for links associated with the base station device may be allocated in an additional way.

In step S7140, the master user device 3000-8 receiving the first transmission from the base station device 2000 may determine resources for transmitting the first transmission to the slave user device 3000-5. Similar to step S6130, the master user device 3000-8 may determine, based on a link identifier of a first link (for example, link 105 in FIG. 1) associated with the slave user device 3000-5 and the resource allocation configuration information, the resource that will be used. Since the first link will be used for transmission, the resource used may be a non-competitive resource. The non-competitive resource is, for example, part of the non-competitive resource block $F_{B1}$ described above.

After determining the non-competitive resource to be used, the data routing module 3032 of the master user device 3000-8 may use the non-competitive resource to transmit the first transmission to slave user device 3000-5 through the first link between the master user device 3000-8 and the slave user device 3000-5 (for example, link 105), as illustrated by data flow 7015.

In step S7150, the slave user device 3000-5 may perform information processing on the received first transmission and/or the second transmission. The information processing may include analog processing and digital processing, such as demodulation and decoding, among others. Preferably, the slave user device 3000-5 may further transmit an acknowledgement message (not shown) to the slave user device 3000-1, after successfully decoding one or both of the first transmission and the second transmission.

In the example of FIG. 7, inter-cluster communication is achieved through two links. The inter-cluster communication includes the first transmission and the second transmission from one slave user device 3000-1 to another slave user device 3000-5. The two links include a multi-layer communication link (links 101, 104, 108 and 105) for the first transmission and a second link (link 205) for the direct second transmission. The multi-layer communication link used for the first transmission not only uses the master user device (user device 3000-4) of the device cluster A as a routing node, but also uses the base station device 2000 and the master user device (user device 3000-8) of the device cluster B as routing nodes.

It should be noted that the example of FIG. 7 is merely schematic. As one example, the target recipient may be the master user device (for example, master user device 3000-8) of the device cluster B. In this case, the data flow representing the first transmission may include 7012-7014 but not 7015. As another example, the transmitter may be the user device 3000-5, while the target recipient may be the user device 3000-1. Also, for one transmitter, there may be a plurality of target recipients. One target recipient may also receive transmissions from a plurality of transmitters.

Furthermore, it should also be noted that the order of data flow 7011 and data flows 7012-7015 illustrated in FIG. 7 does not mean that the second transmission necessarily precedes the first transmission. The first transmission and the second transmission may be performed in any order, and may also be performed simultaneously. In order to distinguish the first transmission from the second transmission, the data flow representing the second transmission is illustrated in FIG. 7 using dashed lines.

According to embodiments of the disclosure, in the hybrid access mode, the first transmission and the second transmission may contain associated data, whether it is intra-cluster communication or inter-cluster communication. For example, the first transmission and the second transmission may contain the same data. Preferably, there may also be a certain difference between the data included in the first transmission and the data included in the second transmission. The data allocated to the first transmission and the second transmission may be managed by the data management module 3036 of the slave user device 3000 as a transmitter.

According to embodiments of the disclosure, the data management module 3036 may allocate data with different transmission requirements to the first transmission and the second transmission, respectively. For example, the data management module 3036 may allocate data with higher reliability requirements or a higher priority to the first transmission. This is because the first link (in particular, the multi-layer communication link) used for the first transmission may have higher reliability. Additionally or alternatively, the data management module 3036 may include part or all of the first transmission in the second transmission, so that the first transmission and the second transmission constitute redundant transmissions to further ensure the part or all of the data is successfully transmitted.

As one example, the data management module 3036 may include Physical Sidelink Control Channel (PSCCH) control information in the first transmission, and Physical Sidelink Share Channel (PSSCH) traffic data in the second transmission. The PSSCH traffic data may correspond to the PSCCH control information. Compared with PSSCH traffic data, the PSCCH control information has a higher reliability requirement, so it may be included in the first transmission, so that non-competitive resources may be used for reliable transmission.

As another example, the data management module 3036 may include the PSCCH control information in the first transmission and include the PSCCH control information along with the PSSCH traffic data in the second transmission. In this way, the first transmission and the second transmission implement redundant transmissions of the PSCCH control information to further ensure that the PSCCH control information is successfully transmitted.

As one example, the data management module 3036 may include a first portion of the PSSCH traffic data with a higher priority in the first transmission, and include a second portion of the PSSCH traffic data with a lower priority in the second transmission.

As another example, the data management module 3036 may include the entire PSSCH traffic data in the second transmission, and include a first portion of the PSSCH traffic data with a high priority in the first transmission. In this way, the first transmission and the second transmission imple- ment redundant transmissions of the first portion of the PSSCH traffic data with a high priority, to further ensure that the first portion is successfully transmitted.

In the examples of FIGS. 6 and 7, the slave user device 3000-1 transmitting the first transmission may designate a multi-layer communication link for the first transmission. This may be performed by the transmission management module 3034 of the slave user device 3000-1. As one example, the transmission management module 3034 may include an identifier of the target recipient in the first transmission. The identifier may be, for example, a device identifier of a user device. In step S6120 or S7130, the identifier of the target recipient may be used by the master user device 3000-4 associated with the transmitter (user device 3000-1) to determine whether to forward the first transmission to a base station. As another example, the transmission management module 3034 of the slave user device 3000-1 may plan a multi-layer communication link based on the target recipient and the cluster division infor- mation. Since the cluster information may indicate a device cluster to which the target recipient belongs and the master user device of that device cluster, the transmission manage- ment module 3034 may directly determine every routing node in the multi-layer communication link. The transmis- sion management module 3034 may include the determined sequence of routing nodes (user devices and/or base sta- tions) in the first transmission. Each node that receives the first transmission may check, based on the sequence, for the next node to which to transmit the first transmission, thereby transmitting the first transmission to that next node.

In the example of FIGS. 6 and 7, in the information processing step S6140 or S7150, the user device as the target recipient may transmit an acknowledgement message to indicate successful decoding of at least one of the first transmission and the second transmission. For example, when the slave user device 3000-2 or 3000-5 is the target recipient and the first transmission and the second transmis- sion constitute redundant transmissions, the slave user device may be configured to transmit the acknowledgment message, upon successfully receiving and decoding one of the first transmission and the second transmission, so as to terminate the transmission of the other one of the first transmission and the second transmission. This function may be performed by the data management module 3036 of the slave user device.

In particular, the data management module 3036 may be configured to, in response to receiving and successfully decoding the first transmission earlier than the second trans- mission, transmit the acknowledgment message to the mas- ter user device via the first link between the target recipient and the master user device. The acknowledgment message may be further forwarded by the master user device to the transmitter to indicate the transmitter to terminate the second transmission. In response to receiving and successfully decoding the second transmission earlier than the first trans- mission, the data management module 3036 may transmit the acknowledgment message directly to the transmitter via the second link between the target recipient and the trans- mitter, thereby instructing the transmitter to terminate the first transmission. Preferably, the acknowledgment message may be a Hybrid Automatic Repeat Request (HARQ) mes- sage.

7. Exemplary Communication Methods

Figures 8, 9:
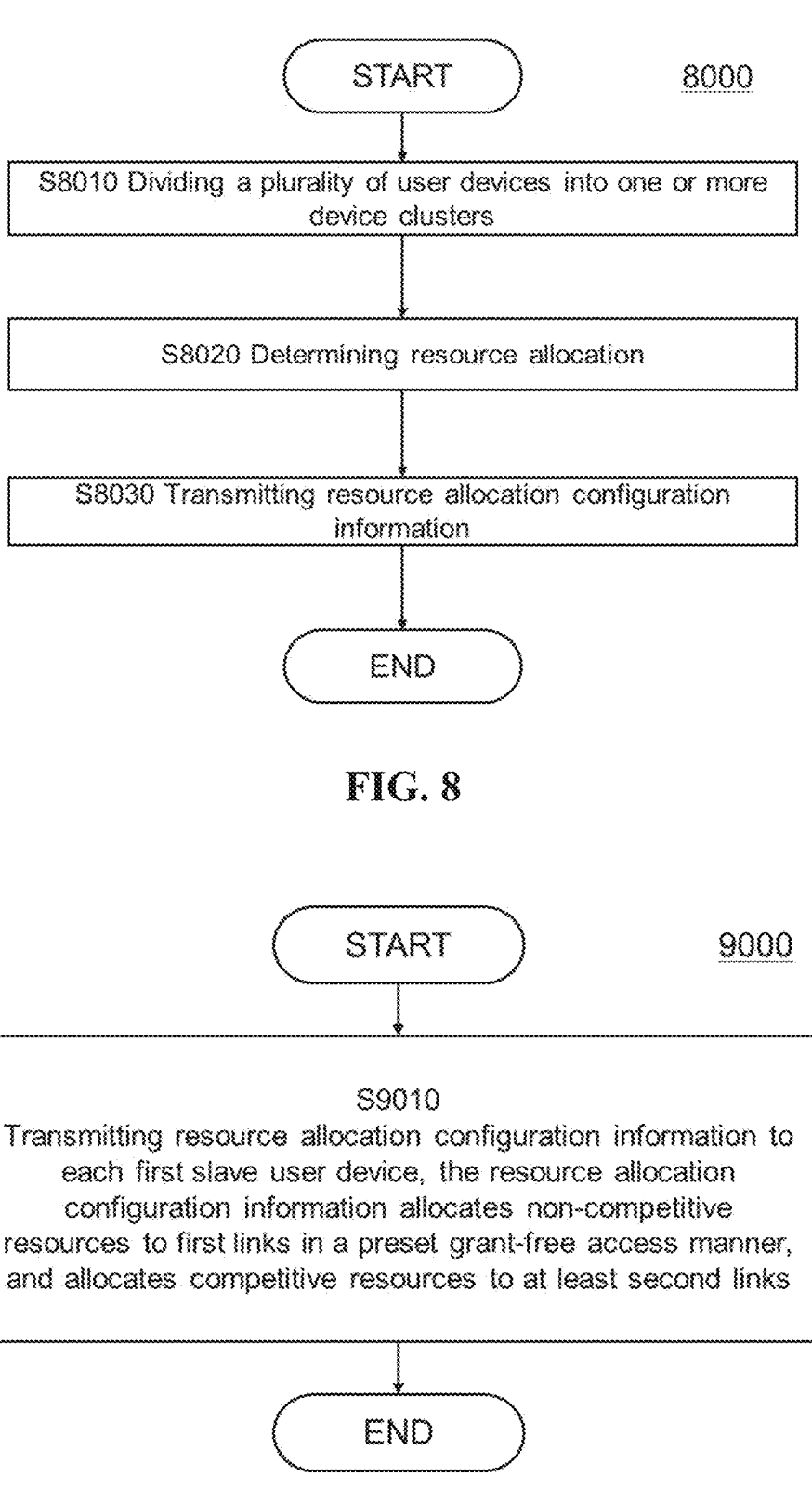
FIGS. 8-10 illustrate one or more communication methods according to embodiments of the disclosure.

FIG. 8 illustrates a flowchart of a communication method 8000 according to embodiments of the disclosure. The communication method 8000 may be performed by the base station device 2000, for example.

According to embodiments of the disclosure, the commu- nication method 8000 may include at least steps S8010- S8030. In step S8010, the base station device 2000 may divide a plurality of user devices into one or more device clusters, and each device cluster may include an associated master user device and one or more slave user devices. Step S8010 may be performed by, for example, the device cluster division module 2031 of the base station device 2000. In step S8020, the base station device 2000 may determine resource allocation. The resource allocation may allocate non-competitive resources and competitive resources in a preset grant-free access manner. The non-competitive resources may be allocated to the first links between a master user device of a device cluster and slave user devices of the device cluster, and the non-competitive resources may be allocated to at least the second links. The second links may include intra-cluster second links among a plurality of slave user devices of the same device cluster and/or inter-cluster second links between user devices belonging to different device clusters. In step S8030, the base station device 2000 may transmit resource allocation configuration information including the resource allocation to the master user device and/or the slave user devices. Steps S8020 and S8030 may be performed by, for example, the resource configuration module 2032 of the base station device 2000.

According to embodiments of the disclosure, the commu- nication method 8000 may further include one or more operations described above with respect to the base station device 2000, which will not be repeated here.

FIG. 9 illustrates a flowchart of a communication method 9000 according to embodiments of the disclosure. The communication method 9000 may be performed, for example, by the master user device 3000 (for example, the master user device 3000-4 in the device cluster A of FIG. 1). The master user device 3000 may be associated with a device cluster, and the device cluster includes one or more first slave user devices.

According to embodiments of the disclosure, the commu- nication method 9000 may include at least step S9010. In step S9010, the master user device 3000 may transmit resource allocation configuration information to each first slave user device in a device cluster. The resource allocation configuration information may allocate non-competitive resources to first links between a master user device and each first slave user device in a preset grant-free access manner and allocate non-competitive resources to at least second links. The second links may include intra-cluster second links among a plurality of first slave user devices and/or inter-cluster second links between the first slave user devices and user devices that do not belong to the device cluster. Step S9010 may be performed by, for example, the resource allocation module 3031 of the master user device 3000.

According to embodiments of the disclosure, the commu- nication method 9000 may further include one or more operations described above with respect to the master user device 3000, which will not be repeated here.

Figure 10:
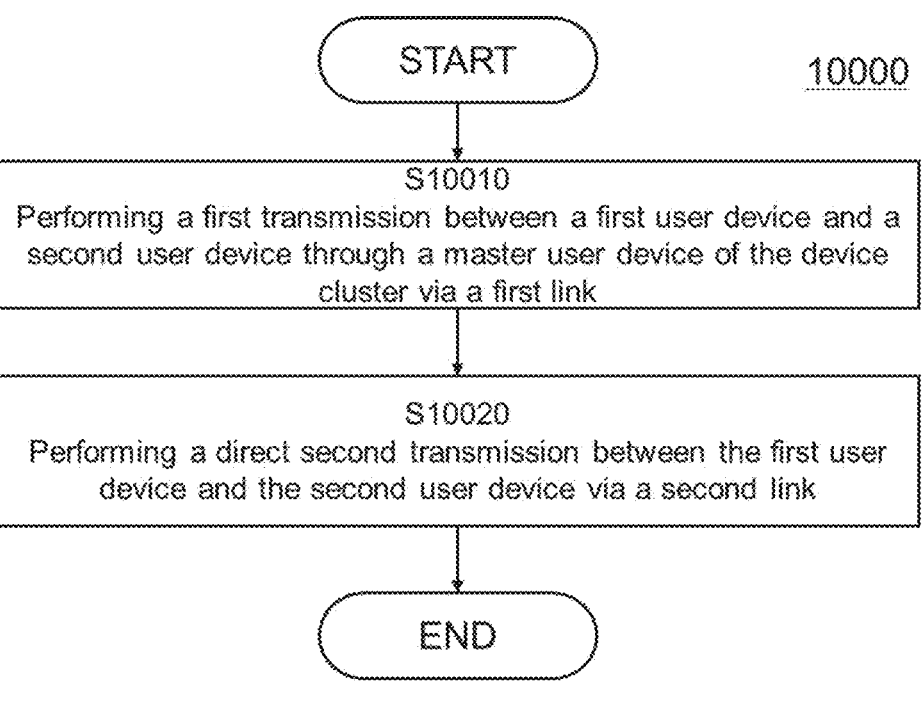

FIG. 10 illustrates a flowchart of a communication method 10000 according to embodiments of the disclosure. The communication method 10000 may, for example, be performed by the slave user device 3000 (for example, the slave user device 3000-1 in the device cluster A of FIG. 1). The slave user device 3000 may be associated with a device cluster.

According to embodiments of the disclosure, the communication method 10000 may include at least steps S10010- S10020. In step S10010, the slave user device 3000 may perform a first transmission between a first user device and a second user device through a master user device of the device cluster via a first link. In step S10020, the slave user device 3000 may perform a direct second transmission between the first user device and the second user device via a second link. Steps S10010 and S10020 may be performed, for example, by the transmission management module 3034 of the user device 3000, wherein the first transmission may be performed with non-competitive resources, while the second transmission may be performed with competitive resources.

According to embodiments of the disclosure, the communication method 10000 may further include one or more operations described above with respect to the slave user device 10000, which will not be repeated here.

The systems and methods of the disclosure may be used in a URLLC-mMTC scenario. By screening active links, the number of communication links is substantially reduced and the communication environment is simplified. Flexible resource allocation allows a plurality of links with different priorities to have different communication qualities. By making a plurality of links work together in the hybrid access mode, it may adapt to communication scenarios with different complexity and latency requirements. In the case of limited resources, the methods and systems of the present disclosure may improve the reliability of communication and reduce the communication latency of the system, so that URLLC services may be provided to massive users.

8. Application Examples of the Disclosure

The technology of present disclosure may be applied to various scenarios and various products.

A base station device may be any type of base station, preferably, such as a macro gNB and a small gNB in 3GPP's 5G communication standard New Radio (NR) access technology. The small gNBs may be a gNB covering a cell smaller than a macro cell, such as a pico gNB, a micro gNB, and a home (femto) gNB. Alternatively, the base station device may be implemented as any other type of base station, such as a NodeB and a base transceiver station (BTS). The base station device may include: a main body (also referred to as a base station side device) configured to control wireless communication, and one or more remote radio heads (RRHs) disposed in a different place from the main body.

A user device may be implemented as a mobile terminal (such as a smart phone, a tablet personal computer (PC), a notebook PC, a portable game terminal, a portable/dongle type mobile router, and a digital camera apparatus) or an in-vehicle terminal (such as a car navigation device). The user device may also be implemented as a terminal that performs machine-to-machine (M2M) communication (also referred to as a machine type communication (MTC) terminal). In addition, the user device may be a wireless communication module (such as an integrated circuit module comprising a single wafer) mounted on each of the above terminals.

8.1. Application Examples of Base Station Device

First Application Example

Figure 11:
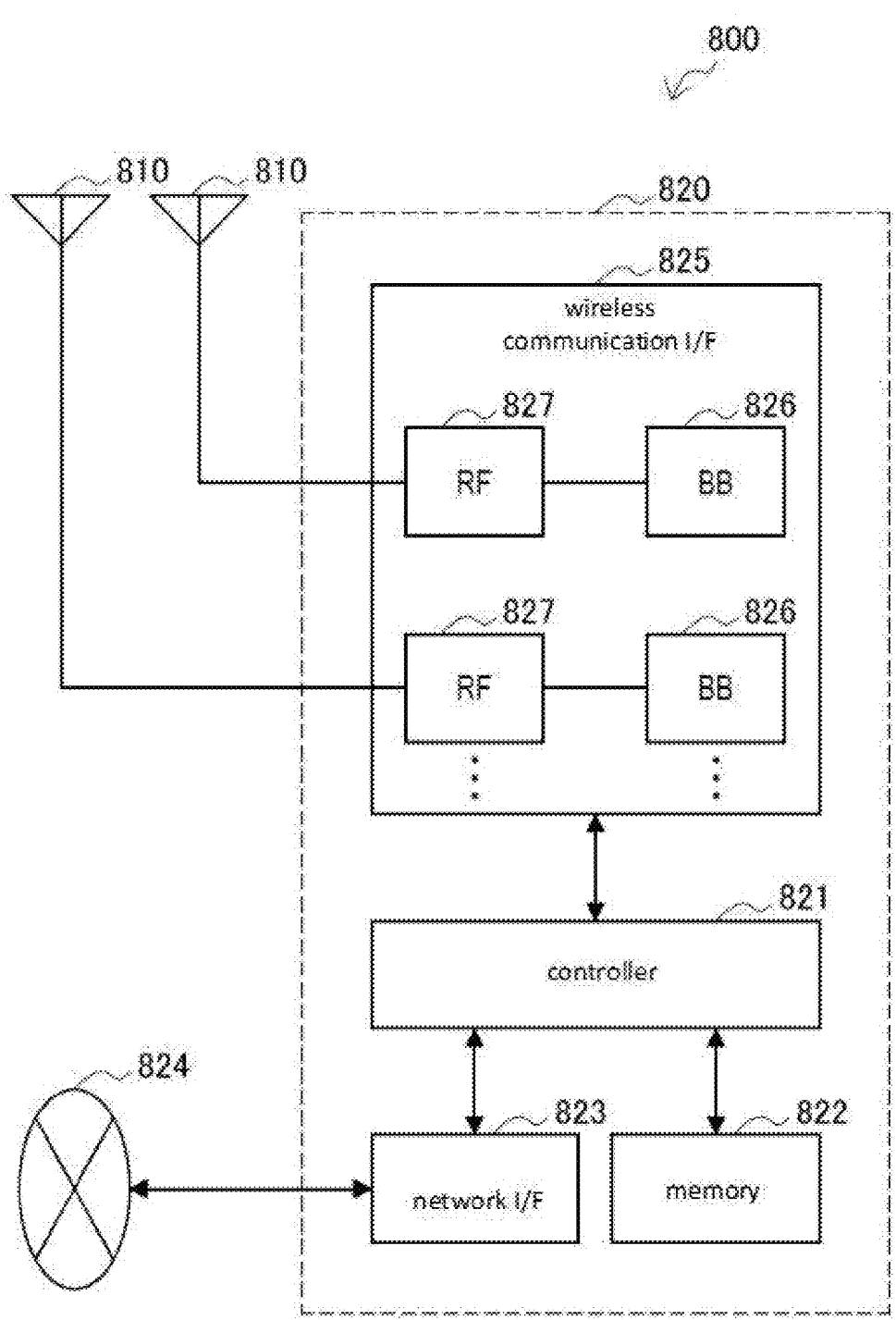
FIG. 11 is a block diagram of a first example of a schematic configuration of a base station device according to embodiments of the disclosure.

FIG. 11 is a block diagram showing a first example of a schematic configuration of a base station device to which the technology of the disclosure may be applied. The base station device is illustrated as gNB 800. The gNB 800 includes multiple antennas 810 and base station device 820. The base station apparatus 820 and each antenna 810 may be connected to each other via an RF cable.

Each of the antennas 810 includes multiple antenna elements (such as multiple antenna elements included in a multiple-input multiple-output (MIMO) antenna), and is used by the base station apparatus 820 to transmit and receive wireless signals. As illustrated in FIG. 11, the gNB 800 may include multiple antennas 810. For example, the multiple 810 may be compatible with multiple frequency bands used by the gNB 800. FIG. 11 illustrates an example in which the gNB 800 includes multiple antennas 810.

The base station apparatus 820 includes a controller 821, a memory 822, a network interface 823, and a wireless communication interface 825.

The controller 821 may be, for example, a CPU or a DSP, and operates various functions of higher layers of the base station apparatus 820. For example, the controller 821 may include the above processing circuitry 2030 to perform various operations according to the methods described above, or control various components of the base station device 2000. For example, the controller 821 generates data packets from data in signals processed by the wireless communication interface 825 and transfers the generated packets via the network interface 823. The controller 821 may bundle data from a plurality of baseband processors to generate a bundled packet, and transfer the generated bundled packet. The controller 821 may have logical functions to perform controls such as radio resource control, radio bearer control, mobility management, admission control and scheduling. The controls may be performed in conjunction with nearby gNBs or core network nodes. The memory 822 includes RAM and ROM, and stores programs executed by the controller 821 and various types of control data (such as a terminal list, transmission power data, and scheduling data).

The network interface 823 is a communication interface for connecting the base station apparatus 820 to the core network 824. The controller 821 may communicate with a core network node or another gNB via the network interface 823. In this case, the gNB 800 and the core network nodes or other gNBs may be connected to each other through a logical interface (such as an Si interface and an X2 interface). The network interface 823 may also be a wired communication interface or a wireless communication interface for radio backhaul. If the network interface 823 is a wireless communication interface, the network interface 823 may use a higher frequency band for wireless communication than the frequency band used by the wireless communication interface 825.

Wireless communication interface 825 supports any cellular communication scheme (such as Long Term Evolution (LTE) and LTE-Advanced), and provides wireless connection to a terminal located in a cell of the gNB 800 via the antenna 810. The wireless communication interface 825 may generally include, for example, a baseband (BB) processor 826 and an RF circuit 827. The BB processor 826 may perform, for example, encoding/decoding, modulation/demodulation, and multiplexing/demultiplexing, and performs various types of signal processing of layers (for example, L1, Medium Access Control (MAC), Radio Link Control (RLC), and Packet Data Convergence Protocol (PDCP)). Instead of the controller 821, the BB processor 826 may have a part or all of above logical functions. The BB processor 826 may be a memory storing a communication control program, or a module including a processor and related circuit configured to execute the program. Updating the program may change functions of the BB processor 826. The module may be a card or a blade inserted into a slot of the base station apparatus 820. Alternatively, the module may also be a chip mounted on a card or blade. Meanwhile, the RF circuit 827 may include, for example, a mixer, a filter, and an amplifier, and transmit and receive wireless signals via the antenna 810.

As illustrated in FIG. 11, the wireless communication interface 825 may include multiple BB processors 826. For example, the multiple BB processors 826 may be compatible with multiple frequency bands used by the gNB 800. As illustrated in FIG. 11, the wireless communication interface 825 may include multiple RF circuits 827. For example, the multiple RF circuits 827 may be compatible with multiple antenna elements. Although FIG. 11 illustrates an example in which the wireless communication interface 825 includes multiple BB processors 826 and multiple RF circuits 827, the wireless communication interface 825 may also include a single BB processor 826 or a single RF circuit 827.

In the gNB 800 illustrated in FIG. 11, one or more components included in the processing circuitry 2030 described with reference to FIG. 2 may be implemented in the wireless communication interface 825. Alternatively, at least a part of these components may be implemented in the controller 821. For example, the gNB 800 contains a portion (for example, the BB processor 826) or the whole of the wireless communication interface 825, and/or a module including controller 821, and one or more components may be implemented in the module. In this case, the module may store a program for allowing the processor to function as one or more components (in other words, a program for allowing the processor to perform operations of the one or more components), and may execute the program. As another example, a program for allowing a processor to function as one or more components may be installed in the gNB 800, and the wireless communication interface 825 (for example, the BB processor 826) and/or the controller 821 may execute the program. As described above, as an apparatus including one or more components, a gNB 800, a base station device 820 or a module may be provided, and a program for allowing the processor to function as one or more components may be provided. In addition, a readable medium in which the program is recorded may be provided.

In addition, in the gNB 800 illustrated in FIG. 11, the communication unit 2010 described with reference to FIG. 2 may be implemented in the wireless communication interface 825 (for example, the RF circuit 827). In addition, the communication unit 2010 may be implemented in the controller 821 and/or the network interface 823.

Second Application Example

Figure 12:
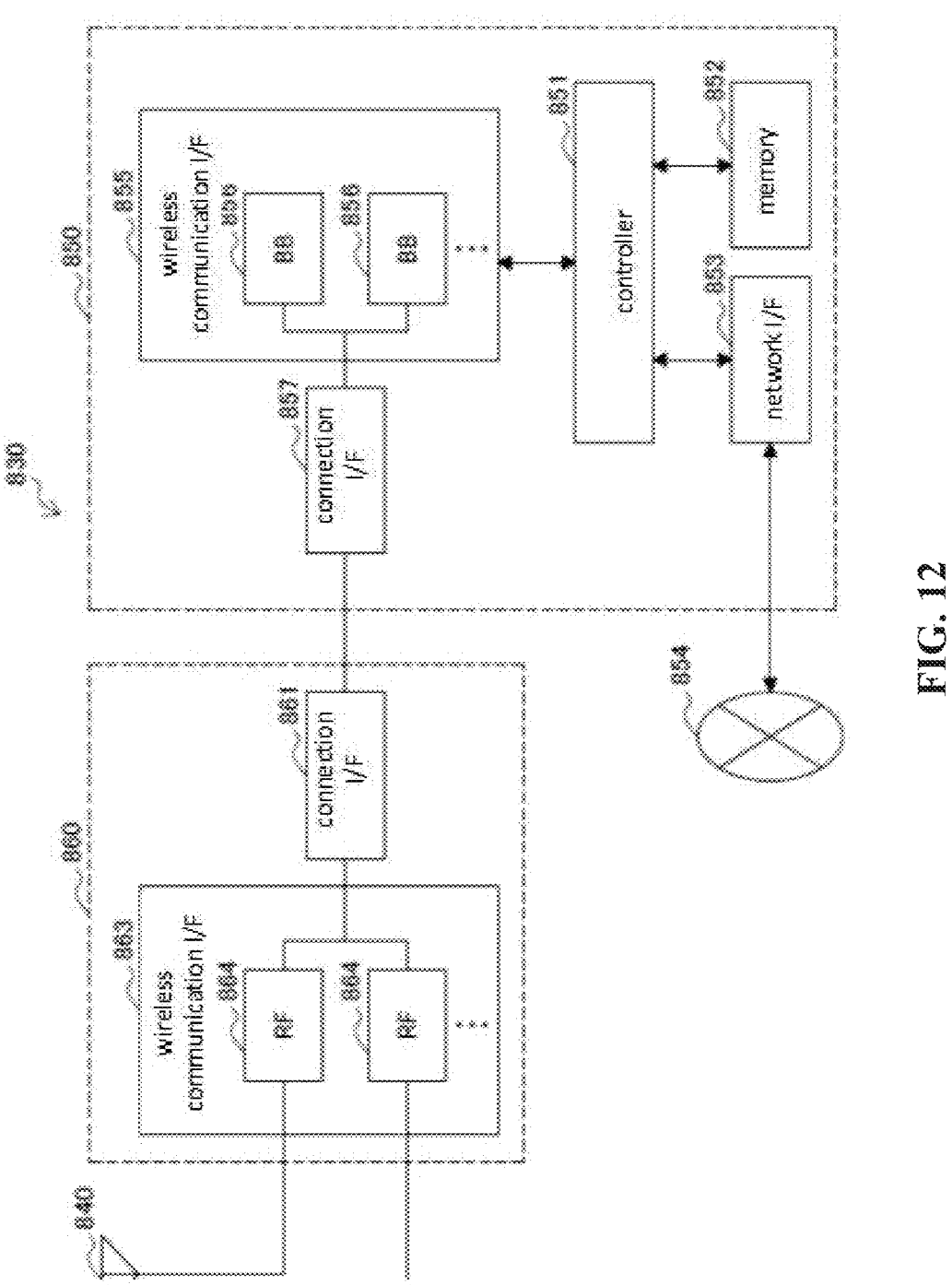
FIG. 12 is a block diagram of a second example of a schematic configuration of a base station device according to embodiments of the disclosure.

FIG. 12 is a block diagram showing a second example of a schematic configuration of a base station device to which the technology of the disclosure may be applied. The base station device may be the base station device 2000 according to embodiments of the disclosure. Base station device 2000 is illustrated as gNB 830. The gNB 830 includes one or more antennas 840, a base station apparatus 850 and a RRH 860. The RRH 860 and each antenna 840 may be connected to each other via an RF cable. The base station apparatus 850 and the RRH 860 may be connected to each other via a high-speed line such as an optical fiber cable.

Each of the antennas 840 includes a single or multiple antenna elements (such as multiple antenna elements included in a MIMO antenna) and is used by the RRH 860 to transmit and receive wireless signals. As illustrated in FIG. 12, the gNB 830 may include multiple antennas 840. For example, the multiple 840 may be compatible with multiple frequency bands used by the gNB 830. FIG. 12 illustrates an example in which the gNB 830 includes multiple antennas 840.

The base station apparatus 850 includes a controller 851, a memory 852, a network interface 853, a wireless communication interface 855, and a connection interface 857. The controller 851, the memory 852 and the network interface 853 are the same as the controller 821, the memory 822 and the network interface 823 described with reference to FIG. 11.

Wireless communication interface 855 supports any cellular communication scheme (such as LTE and LTE-Advanced), and provides wireless communication to a terminal located in a sector corresponding to the RRH 860 via RRH 860 and the antenna 840. The wireless communication interface 855 may generally include, for example, a BB processor 856. The BB processor 856 is the same as the BB processor 826 described with reference to FIG. 11, except that the BB processor 856 is connected to the RF circuit 864 of the RRH 860 via the connection interface 857. As illustrated in FIG. 12, the wireless communication interface 855 may include multiple BB processors 856. For example, the multiple BB processors 856 may be compatible with multiple frequency bands used by the gNB 830. Although FIG. 12 illustrates an example in which the wireless communication interface 855 includes multiple BB processors 856, the wireless communication interface 855 may also include a single BB processor 856.

The connection interface 857 is an interface for connecting the base station apparatus 850 (wireless communication interface 855) to the RRH 860. The connection interface 857 may also be a communication module for communication in the above high-speed line connecting the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above high-speed line.

The wireless communication interface 863 transmits and receives wireless signals via the antenna 840. The wireless communication interface 863 may generally include, for example, an RF circuit 864. The RF circuit 864 may include, for example, a mixer, a filter, and an amplifier, and transmit and receive wireless signals via the antenna 840. As illustrated in FIG. 12, the wireless communication interface 863 may include multiple RF circuits 864. For example, the multiple RF circuits 864 may support multiple antenna elements. Although FIG. 12 illustrates an exemplary in which the wireless communication interface 863 includes multiple RF circuits 864, the wireless communication interface 863 may also include a single RF circuit 864.

In the gNB 830 illustrated in FIG. 12, one or more components included in the processing circuitry 2030 described with reference to FIG. 2 may be implemented in the wireless communication interface 855. Alternatively, at least a part of these components may be implemented in the controller 851. For example, the gNB 830 includes a portion (for example, the BB processor 856) or the whole of the wireless communication interface 855, and/or a module including the controller 851, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 830, and the wireless communication interface 855 (for example, the BB processor 856) and/or the controller 851 may execute the program. As described above, as an apparatus including one or more components, a gNB 830, a base station device 850, or a module may be provided, and a program for allowing the processor to function as one or more components may be provided. In addition, a readable medium in which the program is recorded may be provided.

In addition, in the gNB 830 illustrated in FIG. 12, the communication unit 2010 described with reference to FIG. 2 may be implemented in the wireless communication interface 855 (for example, the BB circuit 856). In addition, the communication unit 2010 may be implemented in the controller 851 and/or the network interface 853.

8.2. Application Examples of the User Device

First Application Example

Figure 13:
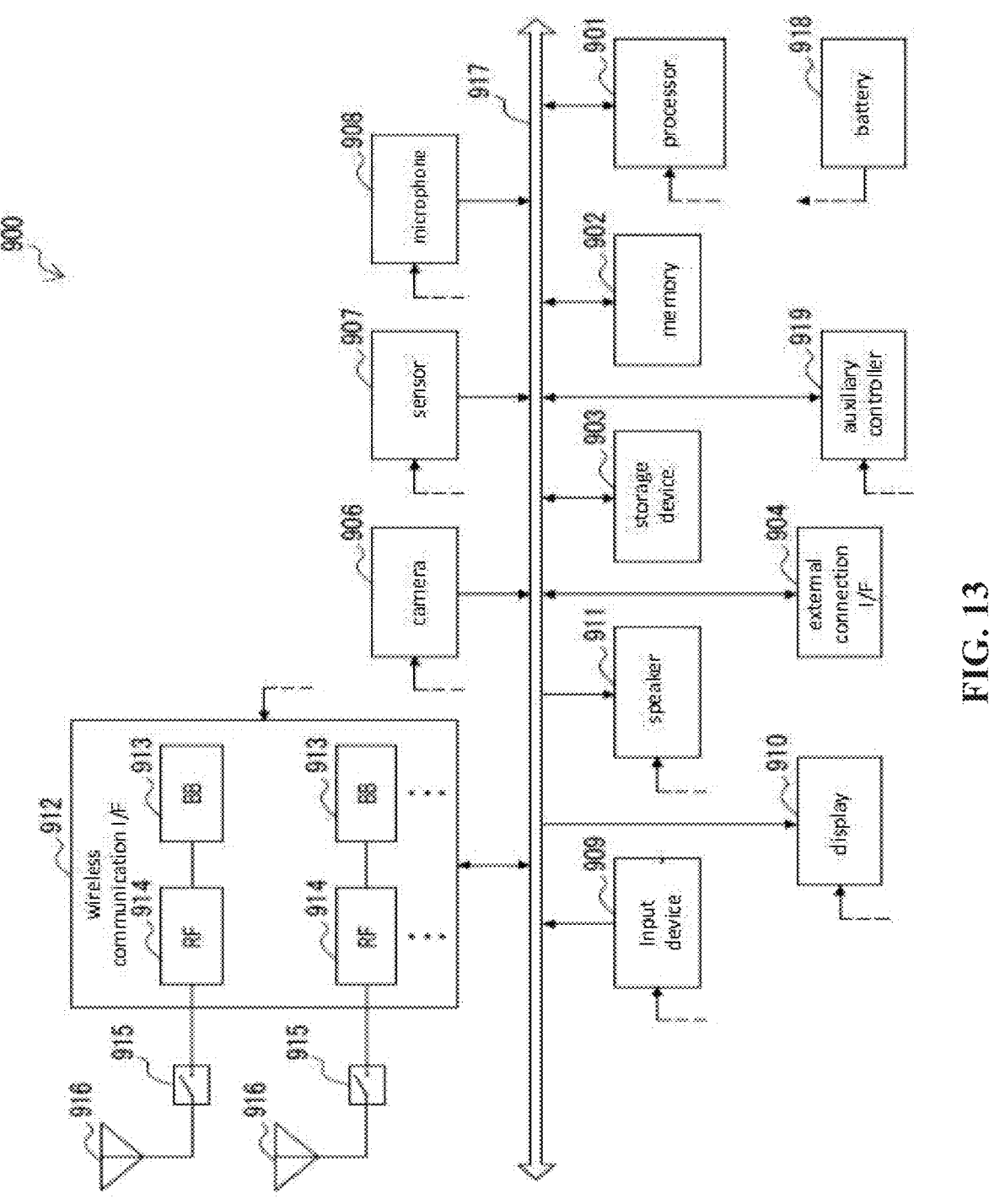
FIG. 13 is a block diagram of an example of a schematic configuration of a smart phone according to embodiments of the disclosure.

FIG. 13 is a block diagram showing an example of a schematic configuration of a smart phone 900 to which the technology of the disclosure may be applied. The smart phone 900 may be a user device 3000 according to embodiments of the disclosure. The smart phone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switch 915, one or more antennas 916, a bus 917, a battery 918, and an auxiliary controller 919.

The processor 901 may be, for example, a CPU or a system on a chip (SoC), and controls functions of an application layer and other layers of the smart phone 900. The memory 902 includes RAM and ROM, and stores data and programs executed by the processor 901. The storage 903 may include a storage medium such as a semiconductor memory and a hard disk. The external connection interface 904 is an interface for connecting an external device such as a memory card and a universal serial bus (USB) device to the smart phone 900.

The camera 906 includes an image sensor such as a charge coupled device (CCD) and a complementary metal oxide semiconductor (CMOS), and generates a captured image. The sensor 907 may include a group of sensors, such as a measurement sensor, an f-gyro sensor, a geomagnetic sensor, and an acceleration sensor. The microphone 908 converts sounds that are input to the smart phone 900 into audio signals. The input device 909 includes, for example, a touch sensor configured to detect touch on the screen of the display device 910, a keypad, a keyboard, a button, or a switch, and receives an operation or information input from a user. The display device 910 includes a screen such as a liquid crystal display (LCD) and an organic light emitting diode (OLED) display, and displays an output image of the smart phone 900. The speaker 911 converts audio signals that are output from the smart phone 900 into sounds.

The wireless communication interface 912 supports any cellular communication scheme (such as LTE and LTE-Advanced) and performs wireless communication. The wireless communication interface 912 may generally include, for example, a BB processor 913 and an RF circuit 914. The BB processor 913 may perform, for example, encoding/decoding, modulating/demodulating, and multiplexing/demultiplexing, and perform various types of signal processing for wireless communication. Meanwhile, the RF circuit 914 may include, for example, a mixer, a filter, and an amplifier, and transmit and receive wireless signals via the antenna 916. The wireless communication interface 912 may be one chip module on which the BB processor 913 and the RF circuit 914 are integrated. As illustrated in FIG. 13, the wireless communication interface 1512 may include multiple BB processors 1513 and multiple RF circuits 1514. Although FIG. 13 illustrates an exemplary in which the wireless communication interface 1512 includes multiple BB processors 1513 and multiple RF circuits 1514, the wireless communication interface 1512 may also include a single BB processor 1513 or a single RF circuit 914.

Furthermore, in addition to the cellular communication scheme, the wireless communication interface 912 may support another type of wireless communication scheme, such as a short-range wireless communication scheme, a near field communication scheme, and a wireless local area network (LAN) scheme. In this case, the wireless communication interface 912 may include a BB processor 913 and an RF circuit 914 for each wireless communication scheme.

Each of the antenna switches 915 switches connection destinations of the antenna 916 among a plurality of circuits (for example, circuits for different wireless communication schemes) included in the wireless communication interface 912.

Each of the antennas 916 includes a single or multiple antenna elements (such as multiple antenna array elements included in a MIMO antenna), and is used for the wireless communication interface 912 to transmit and receive wireless signals. As illustrated in FIG. 13, the smart phone 900 may include multiple antennas 916. Although FIG. 13 illustrates an exemplary in which the smart phone 900 includes multiple antennas 916, the smart phone 900 may also include a single antenna 916.

In addition, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smart phone 900 illustrated in FIG. 13 via a feeder line, which is partially illustrated as a dashed line in the figure. The auxiliary controller 919 operates the minimum necessary functions of the smart phone 900 in a sleep mode, for example.

In the smart phone 900 illustrated in FIG. 13, one or more components included in the processing circuitry 3030 described with reference to FIGS. 3A-3C may be implemented in the wireless communication interface 912. Alternatively, at least a part of these components may be implemented in the processor 901 or the auxiliary controller 919. As one example, the smart phone 900 includes a portion (for example, the BB processor 913) or the whole of the wireless communication interface 912, and/or a module including the processor 901 and/or the auxiliary controller 919, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the smart phone 900, and the wireless communication interface 912 (for example, the BB processor 913), the processor 901, and/or the auxiliary controller 919 may execute the program. As described above, as an apparatus including one or more components, a smart phone 900 or a module may be provided, and a program for allowing the processor to function as one or more components may be provided. In addition, a readable medium in which the program is recorded may be provided.

In addition, in the smart phone 900 illustrated in FIG. 13, for example, the communication unit 3010 described with reference to FIGS. 3A-3C may be implemented in the wireless communication interface 912 (for example, the RF circuit 914).

Second Application Example

Figure 14:
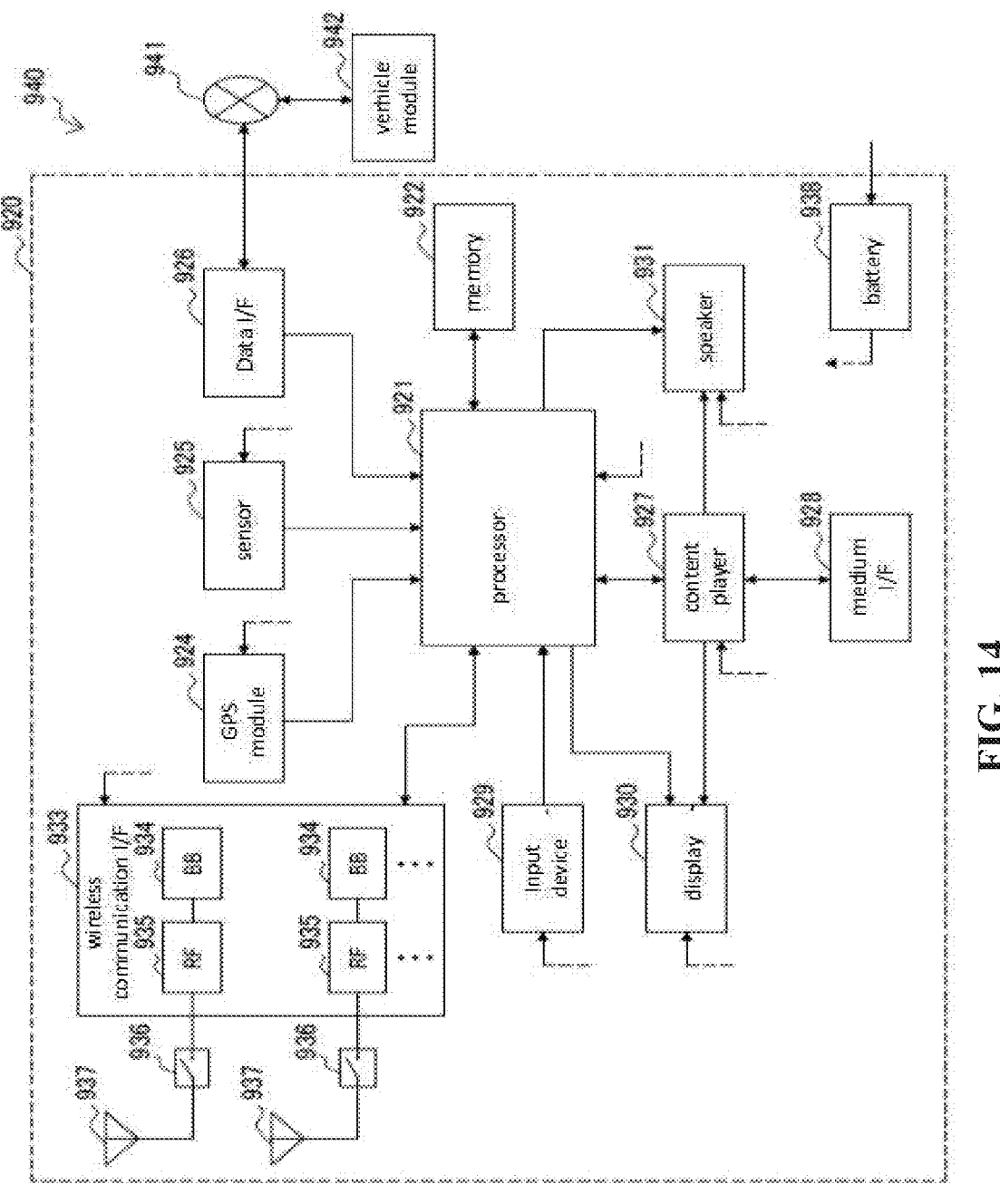
FIG. 14 is a block diagram of an example of a schematic configuration of a car navigation device according to embodiments of the disclosure.

FIG. 14 is a block diagram showing an example of a schematic configuration of a car navigation device 920 to which the technology of the disclosure may be applied. The car navigation device 920 may be a user device 3000 according to embodiments of the disclosure. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and other functions of the car navigation device 920. The memory 922 includes RAM and ROM, and stores data and programs executed by the processor 921.

The GPS module 924 uses GPS signals received from GPS satellites to measure the position (such as latitude, longitude, and altitude) of the car navigation device 920. The sensor 925 may include a group of sensors, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as CD and DVD) that is inserted into the storage medium interface 928. The input device 929 includes, for example, a touch sensor configured to detect touch on the screen of the display device 930, a button, or a switch, and receives an operation or information input from a user. The display device 930 includes a screen such as an LCD or an OLED display, and displays images of navigation functions or reproduced content. The speaker 931 outputs sounds of the navigation functions or the reproduced content.

The wireless communication interface 933 supports any cellular communication scheme (such as LTE and LTE-Advanced) and performs wireless communication. The wireless communication interface 933 may generally include, for example, a BB processor 934 and an RF circuit 935. The BB processor 934 may perform, for example, encoding/decoding, modulating/demodulating, and multiplexing/demultiplexing, and perform various types of signal processing for wireless communication. Meanwhile, the RF circuit 935 may include, for example, a mixer, a filter, and an amplifier, and transmit and receive wireless signals via the antenna 937. The wireless communication interface 933 may also be one chip module on which the BB processor 934 and the RF circuit 935 are integrated. As illustrated in FIG. 14, the wireless communication interface 933 may include multiple BB processors 934 and multiple RF circuits 935. Although FIG. 14 illustrates an exemplary in which the wireless communication interface 933 includes multiple BB processors 934 and multiple RF circuits 935, the wireless communication interface 933 may also include a single BB processor 934 or a single RF circuit 935.

Also, in addition to the cellular communication scheme, the wireless communication interface 933 may support another type of wireless communication scheme, such as a short-range wireless communication scheme, a near field communication scheme, and a wireless LAN scheme. In this case, the wireless communication interface 933 may include a BB processor 934 and an RF circuit 935 for each wireless communication scheme.

Each of the antenna switches 936 switches connection destinations of the antenna 937 among a plurality of circuits (such as circuits for different wireless communication schemes) included in the wireless communication interface 933.

Each of the antennas 937 includes a single or multiple antenna elements (such as multiple antenna array elements included in a MIMO antenna), and is used for the wireless communication interface 933 to transmit and receive wireless signals. As illustrated in FIG. 14, the car navigation device 920 may include multiple antennas 937. Although FIG. 14 illustrates an exemplary in which the car navigation device 920 includes multiple antennas 937, the car navigation device 920 may also include a single antenna 937.

In addition, the car navigation device 920 may include an antenna 937 for each wireless communication scheme. In this case, the antenna switch 936 may be omitted from the configuration of the car navigation device 920.

The battery 938 supplies power to each block of the car navigation device 920 illustrated in FIG. 14 via a feeder line that is partially illustrated as a dashed line in the figure. The battery 938 accumulates electric power supplied from the vehicle.

In the car navigation device 920 illustrated in FIG. 14, one or more components included in the processing circuitry 203 or 503 described with reference to FIG. 2 or FIG. 5 may be implemented in the wireless communication interface 933. Alternatively, at least a part of these components may be implemented in the processor 921. As one example, the car navigation device 920 includes a portion (for example, the BB processor 934) or the whole of the wireless communication interface 933, and/or a module including the processor 921, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 920, and the wireless communication interface 933 (for example, the BB processor 934) and/or the processor 921 may execute the program. As described above, as an apparatus including one or more components, a car navigation device 920 or a module may be provided, and a program for allowing the processor to function as one or more components may be provided. In addition, a readable medium in which the program is recorded may be provided.

In addition, in the car navigation device 920 illustrated in FIG. 14, for example, the communication unit 3010 described with reference to FIGS. 3A-3C may be implemented in the wireless communication interface 933 (for example, the RF circuit 935).

The technology of the disclosure may also be implemented as an in-vehicle system (or vehicle) 940 including one or more blocks in the car navigation device 920, the in-vehicle network 941, and the vehicle module 942. The vehicle module 942 generates vehicle data (such as vehicle speed, engine speed, and failure information), and outputs the generated data to the in-vehicle network 941.

In addition, a readable medium in which the program is recorded may be provided. Therefore, the disclosure also is directed to a computer-readable storage medium on which there is stored a program including instructions, which are used to implement the aforementioned communication method when loaded and executed by a processor such as a processing circuitry or a controller.

The solutions of the disclosure may be implemented with the following exemplary implementations.

Item 1. A first user device, characterized in that, the first user device is associated with a device cluster, the first user device comprising: a processing circuitry configured to: perform a first transmission between the first user device and a second user device through a master user device of the device cluster via a first link; and perform a direct second transmission between the first user device and the second user device via a second link; wherein the first transmission is performed with non-competitive resources, while the second transmission is performed with competitive resources.

Item 2. The first user device according to Item 1, wherein: the first user device and the second user device are both associated with the device cluster; and performing the first transmission between the first user device and the second user device comprises: transmitting, by the first user device through the master user device, the first transmission to the second user device; or receiving, by the first user device through the master user device, the first transmission from the second user device.

Item 3. The first user device according to Item 1, wherein: the second user device is associated with a second device cluster that is different from the device cluster; and performing the first transmission between the first user device and the second user device comprises: transmitting, by the first user device as a transmitter of the first transmission, the first transmission to the second user device through the master user device, a base station, and a second master user device associated with the second device cluster; or receiving, by the first user device as a target recipient of the first transmission, the first transmission originated from the second user device through the master user device, the base station, and the second master user device associated with the second device cluster.

Item 4. The first user device according to Item 1, wherein the processing circuitry is further configured to: receive resource allocation configuration information from at least one of a base station or the master user device, wherein the resource allocation configuration information allocates the non-competitive resources to the first link and allocates the competitive resources to at least the second link in a preset grant-free access manner, such that the first user device is able to perform the first transmission and the second transmission without requesting resource scheduling of the base station.

Item 5. The first user device according to Item 4, wherein: the non-competitive resources are specific to the device cluster; and the competitive resources comprise at least a portion that is specific to the device cluster.

Item 6. The first user device of any one according to Item 1, wherein the first transmission has a higher reliability requirement or a higher priority than the second transmission.

Item 7. The first user device according to Item 6, wherein: (a) the first transmission comprises Physical Sidelink Control Channel (PSCCH) control information, and the second transmission comprises Physical Sidelink Shared Channel (PSSCH) traffic data; or (b) the first transmission comprises Physical Sidelink Control Channel (PSCCH) control information, and the second transmission comprises both the Physical Sidelink Control Channel (PSCCH) control information and Physical Sidelink Shared Channel (PSSCH) traffic data.

Item 8. The first user device according to Item 6, wherein: (a) the first transmission comprises a first portion of Physical Sidelink Shared Channel (PSSCH) traffic data that has a high priority, and the second transmission comprises a second portion of the Physical Sidelink Shared Channel (PSSCH) traffic data that has a low priority; or (b) the second transmission comprises Physical Sidelink Shared Channel (PSSCH) traffic data, and the first transmission comprises a portion of the Physical Sidelink Shared Channel (PSSCH) traffic data in the second transmission that has a high priority.

Item 9. The first user device according to any of Items 1-8, wherein at least one of the first transmission and the second transmission belongs to Ultra Reliable Low Latency Communication (URLLC).

Item 10. The first user device according to Item 1, wherein, the first transmission is a redundant transmission of the second transmission, and the first user device is a target recipient of the first transmission and the second transmission, and the processing circuitry is further configured to: in response to receiving and successfully decoding the first transmission earlier than the second transmission, transmit an acknowledgement message to the master user device via the first link, the acknowledgement message instructing the second user device to terminate the second transmission; and in response to receiving and successfully decoding the second transmission earlier than the first transmission, transmit an acknowledgement message to the second user device via the second link, the acknowledgement message instructing the second user device to terminate the first transmission.

Item 11. The first user device according to Item 10, wherein the acknowledgement message is a HARQ message.

Item 12. A master user device, wherein the master user device is associated with a device cluster, the device cluster including one or more first slave user devices, the master user device comprising: a processing circuitry configured to: transmit resource allocation configuration information to each of the first slave user devices, wherein the resource allocation configuration information allocates non-competitive resources to first links between the master user device and each of the first slave user devices in a preset grant-free access manner, and allocates competitive resources to at least second links, where the second links comprise intra-cluster second links among multiple ones of the first slave user devices and/or inter-cluster second links between the first slave user devices and user devices that do not belong to the device cluster.

Item 13. The master user device according to Item 12, wherein the non-competitive resources are specific to the device cluster; and the competitive resources comprise at least a portion that is specific to the device cluster.

Item 14. The master user device according to Item 12, wherein the processing circuitry is further configured to: receive, from the first slave user device, a first transmission associated with another user device; when the other user device is associated with the device cluster, transmit the first transmission to the other user device; and when the other user device is not associated with the device cluster, transmit the first transmission to a base station.

Item 15. The master user device according to Item 12, wherein the processing circuitry is further configured to: receive, from a base station, a first transmission associated with the first slave user device, the first transmission originating from another user device of a second device cluster that is different from the device cluster; and transmit the first transmission to the particular first slave user device.

Item 16. The master user device according to Item 14 or 15, wherein the first transmission is associated with a second transmission, the second transmission being performed through a second link between the first slave user device and the other user device without going through the master user device, the second transmission being performed using the competitive resources.

Item 17. The master user device according to Item 14 or 15, wherein the processing circuitry is further configured to: receive a HARQ message associated with the first transmission; and transmit the HARQ message to a user device from which the first transmission originated.

Item 18. The master user device according to Item 12, wherein the processing circuitry is further configured to: collect information associated with the one or more first slave user devices; and update the device cluster based on the collected information.

Item 19. divide a plurality of user devices into one or more device clusters, each device cluster comprising an associated master user device and one or more slave user devices; determine resource allocation that allocates non-competitive resources and competitive resources in a preset grant-free access manner, the non-competitive resources being allocated to first links between the master user device of the device cluster and slave user devices of the device cluster, and the competitive resources being allocated to at least second links, the second links comprising intra-cluster second links among a plurality of slave user devices of a same device cluster and/or inter-cluster second links among user devices belonging to different device clusters; and transmit resource allocation configuration information containing the resource allocation to the master user device and/or the slave user devices.

Item 20. The base station device according to Item 19, wherein the processing circuitry is further configured to collect information associated with the plurality of user devices, and based on the information: to divide the plurality of user devices into the one or more device clusters; and/or to update the one or more device clusters.

Item 21. The base station device according to Item 19, wherein the processing circuitry is further configured to: determine a sum of distances, for each user device in each device cluster, from other user devices in the device cluster; and select a user device with the smallest sum as the master user device of the device cluster.

Item 22. The base station device according to Item 19, wherein determining resource allocation comprises: determining, for each device cluster, a non-competitive resource block that is specific to that device cluster; and the size of the non-competitive resource block is determined based on at least one of: a Channel Busy Rate (CBR) or a number of user devices in the device cluster.

Item 23. The base station device according to Item 19, wherein determining resource allocation comprises: determining a rate of change for a plurality of device clusters; and reducing an amount of the non-competitive resources and increasing an amount of the competitive resources when the rate of change is greater than a threshold.

Item 24. The base station device according to Item 19, wherein the processing circuitry is further configured to: determine whether a link between any two user devices in the plurality of user devices is an active link; and allocate the non-competitive resources and/or the competitive resources only to the active link.

Item 25. The base station device according to Item 24, wherein the processing circuitry is configured to determine whether the link is an active link based at least on a priority of the link between two user devices.

Item 26. The base station device according to Item 25, wherein the priority of the link is based at least on a distance between the two user devices, and the processing circuitry is configured to determine a link between two user devices whose distance is less than a threshold as an active link.

Item 27. The base station device according to Item 19, wherein the processing circuitry is further configured to: receive, through a first master user device of a first device cluster of the one or more device clusters, a first transmission from a first slave user device of the first device cluster; and transmit, through a second master user device of a second device cluster of the one or more device clusters, the received first transmission to a second slave user device of the second device cluster.

Item 28. A method of communication, wherein the method is for a first user device associated with a device cluster, the method comprising: by the first user device: performing a first transmission between the first user device and a second user device through a master user device of the device cluster via a first link; and performing a direct second transmission between the first user device and the second user device via a second link; wherein the first transmission is performed with non-competitive resources, while the second transmission is performed with competitive resources.

Item 29. A method of communication, wherein the method is for a master user device associated with a device cluster, the device cluster comprising one or more first slave user devices, the method comprising: by the master user device: transmitting resource allocation configuration information to each of the first slave user devices, wherein the resource allocation configuration information allocates non-competitive resources to first links between the master user device and each of the first slave user devices in a preset grant-free access manner, and allocates competitive resources to at least second links, where the second links comprise intra-cluster second links among multiple ones of the first slave user devices and/or inter-cluster second links between the first slave user devices and user devices that do not belong to the device cluster.

Item 30. A method of communication, wherein the method comprising: by a base station: dividing a plurality of user devices into one or more device clusters, each device cluster comprising an associated master user device and one or more slave user devices; determining resource allocation that allocates non-competitive resources and competitive resources in a preset grant-free access manner, the non-competitive resources being allocated to first links between the master user device of the device cluster and slave user devices of the device cluster, and the competitive resources being allocated to at least second links, the second links comprising intra-cluster second links among a plurality of slave user devices of a same device cluster and/or inter-cluster second links among user devices belonging to different device clusters; and transmitting resource allocation configuration information containing the resource allocation to the master user device and/or the slave user devices.

Item 31. A computer-readable storage medium having a computer program stored thereon, wherein the computer program, when loaded and executed by a processor, is used to implement the method according to any of Items 29-30.

In addition, although the description of the disclosure has included description to one or more embodiments, configurations or aspects, certain variations and modifications, other variations, combinations and modifications are also within the scope of the disclosure, for example, this may be within the skill and knowledge of those skilled in the art after understanding the disclosure. The disclosure is intended to entitle a right which should include alternative embodiments, configurations or aspects within permissible scope, including structures, functions, ranges or steps alternative, interchangeable and/or equivalent to those structures, functions, ranges or steps claimed, whether or not such alternative, interchangeable and/or equivalent structures, functions, ranges or steps are specifically described herein. This document is not intended to publicly contribute any patentable technical solutions.

What is claimed is:

1. A first user device, associated with a device cluster, the first user device comprising:

a processing circuitry configured to:

receive resource allocation configuration information from at least one of a base station or a master user device of the device cluster, wherein the resource allocation configuration information allocates non-competitive resources to a first link of a plurality of links and allocates competitive resources to at least a second link of the plurality of links in a preset grant-free access manner, such that the first user device is able to take part in a first transmission and a second transmission without requesting resource scheduling;

perform the first transmission between the first user device and a second user device through a master user device of the device cluster via the first link; and perform a second transmission directly between the first user device and the second user device via a second link different from the first link, wherein the first transmission is performed with the non-competitive resources, and the second transmission is performed with the competitive resources, wherein the first and second links are active links from among a plurality of active links and one or more inactive links of the plurality of links, wherein the first transmission between the first user device and the second user device through the master user device via the first link has a higher reliability requirement or a higher priority than the second transmission directly between the first user device and the second user device via the second link, wherein the non-competitive resources are specific to the device cluster, wherein the competitive resources comprise a first portion that is specific to the device cluster and a second portion that is specific to a second device cluster different from the first device cluster, and wherein the second user device is associated with the second device cluster that is different from the device cluster.

2. The first user device of claim 1, wherein:

performing the first transmission between the first user device and the second user device includes:

transmitting, by the first user device through the master user device, the first transmission to the second user device; and/or receiving, by the first user device through the master user device, the first transmission from the second user device.

3. The first user device of claim 1, wherein:

performing the first transmission between the first user device and the second user device includes:

transmitting, by the first user device as a transmitter of the first transmission, the first transmission to the second user device through the master user device, the base station, and a second master user device associated with the second device cluster; and/or receiving, by the first user device as a target recipient of the first transmission, the first transmission originated from the second user device through the master user device, the base station, and the second master user device associated with the second device cluster.

4. The first user device of claim 1, wherein:

(a) the first transmission comprises Physical Sidelink Control Channel (PSCCH) control information, and the second transmission comprises Physical Sidelink Shared Channel (PSSCH) traffic data; or (b) the first transmission comprises Physical Sidelink Control Channel (PSCCH) control information, and the second transmission comprises both the Physical Sidelink Control Channel (PSCCH) control information and Physical Sidelink Shared Channel (PSSCH) traffic data.

5. The first user device of claim 1, wherein:

(a) the first transmission comprises a first portion of Physical Sidelink Shared Channel (PSSCH) traffic data that has a high priority, and the second transmission comprises a second portion of the Physical Sidelink Shared Channel (PSSCH) traffic data that has a low priority; or (b) the second transmission comprises Physical Sidelink Shared Channel (PSSCH) traffic data, and the first transmission comprises a portion of the Physical Sidelink Shared Channel (PSSCH) traffic data in the second transmission that has a high priority.

6. The first user device of claim 1, wherein the first transmission between the first user device and the second user device via the first link is through the master user device and the base station.

7. The first user device of claim 6, wherein the first transmission between the first user device and the second user device via the first link is through the master user device, the base station, and a second master user device of the second device cluster.

8. A master user device associated with a device cluster, the device cluster including one or more first slave user devices, the master user device comprising:

a processing circuitry configured to:

receive resource allocation configuration information, wherein the resource allocation configuration information is to allocate non-competitive resources to a plurality of first links of a plurality of links and to allocate competitive resources at least to a plurality of second links of the plurality of links, transmit the resource allocation configuration information to each of the one or more first slave user devices, wherein the resource allocation configuration information allocates the non-competitive resources to the first links between the master user device and each of the one or more first slave user devices in a preset grant-free access manner, and allocates the competitive resources at least to the second links, where the second links include:

intra-cluster second links among multiple ones of the one or more first slave user devices and inter-cluster second links between the one or more first slave user devices and user devices that do not belong to the device cluster, wherein the plurality of first links and the plurality of second links are active links from among a plurality of active links and one or more inactive links of the plurality of links, wherein the first links have a higher reliability requirement or a higher priority than the second links, wherein the non-competitive resources are specific to the device cluster, wherein the competitive resources comprise a first portion that is specific to the device cluster and a second portion that is specific to a second device cluster different from the device cluster and including the user devices that do not belong to the device cluster.

9. The master user device of claim 8, wherein the processing circuitry is further configured to:

receive, from each of the one or more first slave user devices, a first transmission associated with an other user device;

under a first condition where the other user device is associated with the device cluster, transmit the first transmission to the other user device; and under a second condition where the other user device is not associated with the device cluster, transmit the first transmission to a base station.

10. The master user device of claim 9, wherein the first transmission is associated with a second transmission, the second transmission being performed through a corresponding one of the second links between the one or more of the first slave user devices and the other user device without going through the master user device, the second transmission being performed using the competitive resources.

11. The master user device of claim 8, wherein the processing circuitry is further configured to:

receive, from a base station, a first transmission associated with one of the one or more first slave user devices, the first transmission originating from another user device of the second device cluster that is different from the device cluster; and transmit the first transmission to the one first slave user device.

12. A base station device, comprising:

a processing circuitry configured to:

divide a plurality of user devices into a plurality of device clusters, each of the device clusters including an associated master user device and one or more slave user devices;

determine resource allocation that allocates non-competitive resources and competitive resources in a preset grant-free access manner, the non-competitive resources being allocated to a plurality of first links between the master user device of the device cluster and the one or more slave user devices of the device cluster, and the competitive resources being allocated at least to a plurality of second links, the second links comprising intra-cluster second links among a plurality of the one or more slave user devices of a same device cluster of the plurality of device clusters and inter-cluster second links among the plurality of slave user devices belonging to one or more different device clusters different from said same device cluster of the plurality of device clusters; and transmit resource allocation configuration information containing the resource allocation to the master user devices and the slave user devices of the plurality of device clusters, wherein the plurality of first links and the plurality of second links are active links from among a plurality of active links and one or more inactive links of the plurality of links, wherein the first links have a higher reliability requirement or a higher priority than the second links, wherein the non-competitive resources are specific to the plurality of device clusters, and wherein the competitive resources comprise a portion specific to a device cluster different from the plurality of device clusters.

13. The base station device of claim 12, wherein the processing circuitry is further configured to collect information associated with the plurality of user devices, and based on the information:

to divide the plurality of user devices into the plurality of device clusters; and to update the plurality of device clusters.

14. The base station device of claim 12, wherein the processing circuitry is further configured to:

determine a sum of distances, for each user device in each device cluster, from other user devices in the device cluster of the plurality of device clusters; and select a user device with the smallest sum as the master user device of the device cluster of the plurality of device clusters.

15. The base station device of claim 12, wherein determining resource allocation comprises:

determining, for each device cluster of the plurality of device clusters, a non-competitive resource block that is specific to that device cluster; and a size of the non-competitive resource block is determined based on at least one of: a Channel Busy Rate (CBR) or a number of user devices in that device cluster.

16. The base station device of claim 12, wherein determining resource allocation comprises:

determining a rate of change for the plurality of device clusters; and reducing an amount of the non-competitive resources and increasing an amount of the competitive resources under a condition where the rate of change is greater than a threshold.

17. The base station device of claim 12, wherein the processing circuitry is further configured to:

determine whether a link between any two user devices in the plurality of user devices is an active link; and allocate the non-competitive resources and the competitive resources only to links determined to be active.

18. The base station device of claim 12, wherein the processing circuitry is further configured to:

receive, through a first master user device of a first device cluster of the plurality of device clusters, a first transmission from a first slave user device of the one or more slave user devices of the first device cluster; and transmit, through a second master user device of a second device cluster of the plurality of device clusters, the received first transmission to a second slave user device of the second device cluster.

* * * * *